(12) United States Patent
Lossev et al.

(10) Patent No.: US 7,382,921 B2
(45) Date of Patent: Jun. 3, 2008

(54) TRAINING AN ON-LINE HANDWRITING RECOGNIZER

(75) Inventors: Ilia Lossev, Boulder, CO (US); Natalia Bagotskaya, Boulder, CO (US)

(73) Assignee: EverNote Corp., Sunnyvale, CA (US)

( * ) Notice: Subject to any disclaimer, the term of this patent is extended or adjusted under 35 U.S.C. 154(b) by 732 days.

(21) Appl. No.: 10/848,650

(22) Filed: May 18, 2004

(65) Prior Publication Data

US 2004/0213455 A1    Oct. 28, 2004

Related U.S. Application Data

(63) Continuation-in-part of application No. 10/374,482, filed on Feb. 25, 2003, now Pat. No. 7,174,043.

(51) Int. Cl.
*G06K 9/00* (2006.01)
(52) U.S. Cl. ........................ 382/187; 382/159
(58) Field of Classification Search ................ 382/159, 382/173, 181, 186–188, 199, 201, 202–203, 382/209, 218, 226, 229
See application file for complete search history.

(56) References Cited

U.S. PATENT DOCUMENTS 5,303,312 A * 4/1994 Comerford et al. ......... 382/189

(Continued)

OTHER PUBLICATIONS

Kim, et al. "Hierarchical random graph representation of handwritten characters and its application to Hangul recognition", pattern recognition society, pp. 187-201, 2001.*

(Continued)

*Primary Examiner*—Daniel Mariam
(74) *Attorney, Agent, or Firm*—Blakely, Sokoloff, Taylor & Zafmann LLP

(57) ABSTRACT

Character model graphs are created, and the parameters of the model graphs are adjusted to optimize character recognition performed with the model graphs. In effect the character recognizer using the model graphs is trained. The model graphs are created in three stages. First, a vector quantization process is used on a set of raw samples of handwriting symbols to create a smaller set of generalized reference characters or symbols. Second, a character reference model graph structure is created by merging each generalized form model graph of the same character into a single character reference model graph. The merging is based on weighted Euclidian distance between parts of trajectory assigned to graph edges. As a last part of this second stage "type-similarity" vectors are assigned to model edges to describe similarities of given model edge to each shape and to each possible quantized value of other input graph edge parameters. Thus, similarity functions, or similarity values, are defined by different tables on different model edges. In the third stage, model creation further consists of minimizing recognition error by adjusting model graphs parameters. An appropriate smoothing approximation is used in the calculation of similarity score between input graph and model graphs. The input graph represents a word from a work sample set used for training, i.e. adjusting the model graph parameters. A recognition error is calculated as a function of the difference between similarity scores for best answers and the one correct answer for the word being recognized. The gradient of the recognition error as a function of change in parameters is computed and used to adjust the parameters. Model graphs with adjusted parameters are then used to recognize the words in a test set, and a percent of correct recognitions in the test set is calculated. The recognition error calculation with the work set, the parameter adjustment process, and the calculation of the percent of correct recognitions with the test set is repeated. After a number of iterations of this process, the optimum set of parameters for the model graphs will be found.

29 Claims, 14 Drawing Sheets

U.S. PATENT DOCUMENTS

| | | | |
|---|---|---|---|
| 5,742,705 A * | 4/1998 | Parthasarathy | 382/185 |
| 5,757,964 A * | 5/1998 | Lee et al. | 382/229 |
| 5,889,889 A | 3/1999 | Sinden | 382/187 |
| 5,903,668 A | 5/1999 | Beernink | 382/187 |
| 6,052,481 A | 4/2000 | Grajski et al. | 382/187 |
| 6,307,964 B1 * | 10/2001 | Lin et al. | 382/203 |
| 7,003,158 B1 * | 2/2006 | Bennett et al. | 382/187 |

OTHER PUBLICATIONS

I-Jong Lin and S.Y. Kung, "Coding and Comparison of DAGs as a Novel Neural Structure with Applications to On-Line Handwriting Recognition," IEEE Transactions on Signal Processing, 45(11):2701-8, Nov. 1997.

I-Jong Lin and S.Y. Kung, "A Novel Learning Method by Structural Reduction of DAGs for On-Line OCR Applications," International Conference on Acoustic, Speech, and Signal Processing, 1998.

D. Kanevsky, "A Generalization of the Baum Algorithm to Functions on Non-Linear Manifolds," In Proc. International Conference on Acoustic, Speech and Signal Processing, vol. 1, pp. 473-476, 1995.

L. Rabiner, "A Tutorial on Hidden Markov Models and Selected Applications in Speech Recognition," Proceedings of IEEE, 77(2):257-86, Feb. 1989.

Yen-Kuang Chen, "Neural Structure of DAGs," www.ee.Princeton.edu/~ijonglin/spaces/nodes 16.html, Sep. 25, 1998.

Christopher G. Small, "The Statistical Theory of Shape," Springer-Verlag, New York, 1996, pp. 1-26.

PCT International Search Report for PCT/US2004/005272.

"Method for Supporting Stroke Variations in Online Handwritten Character Recognition," IBM Technical Disclosure Bulletin, IBM Corp., New York, vol. 35, No. 5, Oct. 1, 1992, pp. 358-359.

* cited by examiner

MODEL CHARACTER EDGE TABLES

| i TABLE | |
|---|---|
| i | SIM.VALUE |
| 1 | 12 |
| 2 | 9 |
| 3 | 16 |
| 4 | 18 |
| ⋮ | |
| 36 | 89 |
| 37 | 86 |
| 38 | 95 |
| 40 | 82 |
| ⋮ | |
| 127 | 45 |
| 128 | 51 |

— 1002

| j TABLE | |
|---|---|
| j | SIM.VALUE |
| 0 | 50 |
| 1 | 70 |
| 2 | 90 |
| 3 | 75 |
| ⋮ | |
| 24 | 90 |

1004

| k TABLE | |
|---|---|
| k | SIM.VALUE |
| 1 | 25 |
| 2 | 60 |
| ⋮ | |
| 8 | 35 |

TRAINING AN ON-LINE HANDWRITING RECOGNIZER

CROSS-REFERENCE TO RELATED APPLICATIONS

The present patent application is a continuation-in-part application from co-pending, commonly-assigned, U.S. patent application Ser. No. 10/374,482, entitled "ON-LINE HANDWRITING RECOGNIZER", filed Feb. 25, 2003 now U.S. Pat. No. 7,174,043 and claims the benefit of this filing date to the extent of common subject matter in both applications.

FIELD OF THE INVENTION

This invention relates to recognizing handwritten characters with an on-line recognizer that is capable of recognizing handwriting as the characters are being written. More particularly, the invention relates to training such an on-line handwriting recognizer.

BACKGROUND OF THE INVENTION

With the advent of tablet computers with handwritten pen input and with the advent of handwritten pen input for composing messages to be sent on the internet, there is an increasing need for a real time or on-line character recognizer.

In the past, a character recognizer has used a set of reference symbols and a procedure of estimating the similarity between input handwritten trajectory and the trajectory of a given reference symbol. The recognition answer is the reference symbol that has maximum similarity between its trajectory and the input trajectory.

In "Coding and comparison of DAGs (Directed Acyclic Graphs) as a novel neural structure with applications to on-line handwriting recognition," by I-John Lin and S. Y. Kung (IEEE Transactions on Signal Processing, 45(11): 2701-8, November, 1997, both the description of input trajectory and the description of the trajectory for each reference symbol are Directed Acyclic Graphs (DAGs). Having a certain similarity function defined on pairs (input graph edge, model graph edge), i.e. having a score assigning to any edge of a direct product of these two graphs, one can use a dynamic programming procedure for calculating similarity score of these graphs. Different paths connected between initial and last nodes in input graph and the initial and last nodes in the model graph can be interpreted as possible alternative descriptions of the input trajectory and the model trajectory, respectively. The main advantage of this approach is a possibility of choosing different descriptions of the same input trajectory segment while estimating its similarity to trajectory segments of different symbol models. This dynamic programming approach was described in the above-cited publication by I-John Lin and S. Y. Kung.

SUMMARY OF THE INVENTION

This invention relates to creating character model graphs and adjusting the parameters of the model graphs to optimize character recognition performed with the model graphs. In effect the character recognizer using the model graphs is trained by this invention. The model graphs are created in three stages. First, a vector quantization process is used on a set of raw samples of handwriting symbols to create a smaller set of generalized reference characters or symbols. Second, a character reference model graph structure is created by merging each generalized form model graph of the same character into a single character reference model graph. The merging is based on weighted Euclidian distance between parts of trajectory assigned to graph edges. As a last part of this second stage "type-similarity" vectors are assigned to model edges to describe similarities of given model edge to each shape and to each possible quantized value of other input graph edge parameters. Thus, similarity functions, or similarity values, are defined by different tables on different model edges. This is essential for both time consideration purposes and the possibility of third stage learning described below.

In the third stage, model creation further consists of minimizing recognition error by adjusting model graphs parameters. An appropriate smoothing approximation is used in the calculation of similarity score between input graph and model graphs. The input graph represents a word from a work sample set used for training, i.e. adjusting the model graph parameters. The dynamic programming method is used for time-efficiency in calculation of smoothed character similarity scores and smoothed word similarity scores. The word similarity scores vary with the changes in the parameters of the model graphs. A recognition error is calculated as a function of the difference between similarity scores for best answers and the one correct answer for the word being recognized. The gradient of the recognition error as a function of change in parameters is computed and used to adjust the parameters. Model graphs with adjusted parameters are then used to recognize the words in a test set, and a percent of correct recognitions in the test set is stored. The recognition error calculation with the work set, parameter adjustment process, and the calculation of the percent of correct recognitions with the test set is repeated. After a number of iterations of this training process, the optimum set of parameters for the model graphs will be found.

The invention summarized above may be implemented as a computer process, a computing system, or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

The above and various other features as well as advantages, which characterize the present invention, will be apparent from a reading of the following detailed description and a review of the associated drawings.

BRIEF DESCRIPTION OF DRAWINGS

FIG. 10 shows examples of "i, j, k" tables used to define each edge in a model graph.

FIG. 13 shows an example of multiple forms of the character "a" that will be merged into a single model graph.

DETAILED DESCRIPTION

Figure 1:
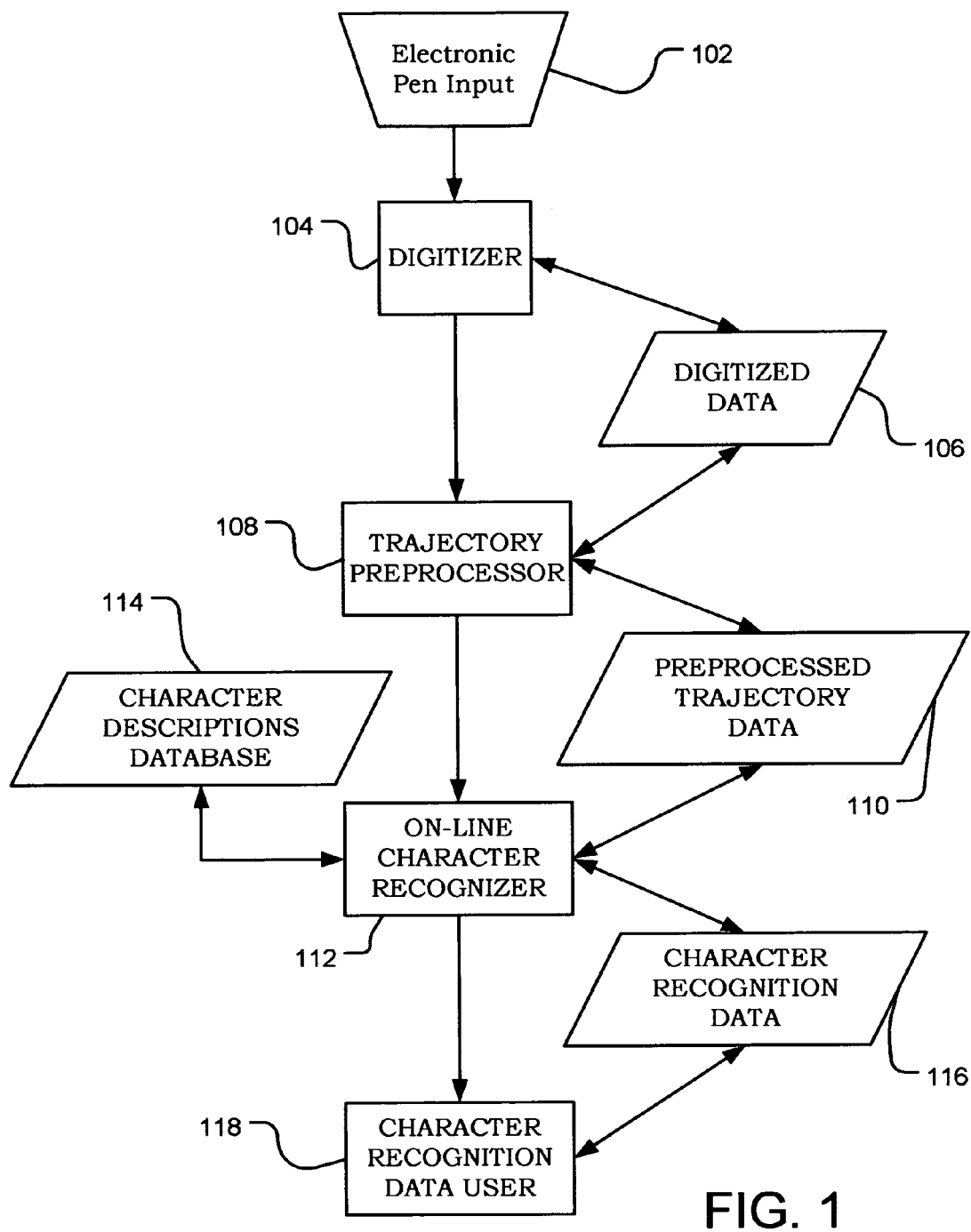
FIG. 1 shows the recognizer in a larger system using the character recognizer to read handwritten input.

FIG. 1 shows the handwritten character recognizer in a system using the character recognizer to transform handwritten character input into electronic character data. Characters as used herein refers to alphanumeric characters as well as symbols. Typical input to a system using the recognizer would be electronic pen input, as in the case of a pen writing on a tablet, a display screen, or a cursor pad. The electronic pen input provides a stroke trajectory which is a sequence of X-Y coordinate points in two dimensional space along a trajectory followed by the pen input. The sequence of X-Y points digitized by digitizer 104 is stored as trajectory digitized data 106. This digitized data 106 is available to the trajectory preprocessor 108.

Trajectory preprocessor 108 will typically clean up the digitized data and segment handwritten words (strings of characters) into handwritten characters for recognition. Thus, the output of the trajectory preprocessor would be a sequence of points for each segmented character of a string of characters. Of course, there are multiple possibilities in doing the segmentation of characters in a handwritten word. Thus, the preprocessed trajectory data may include multiple segmentation points and therefore multiple possible characters for recognition by the character recognizer 112. Any type of segmentation process may be used, and segmentation is not a part of the character recognizer which is the subject of the present invention.

The character recognizer 112 will work with a sequence of points making up the trajectory of one or more strokes for each character it retrieves from the preprocessed trajectory data 110. The recognizer also makes use of the character descriptions in the character description database 114 to produce character recognition data 116. The character recognition data will typically be an identification of the character recognized along with some similarity score or confidence value that the recognition is correct. This character recognition data may be used by the character recognition data user 118 in any number of ways. Most typically it would be used to recognize the input word by making use of word recognition techniques not a part of the present invention.

While the recognizer 112 is described herein as an on-line character recognizer, it will be apparent to one skilled in the art that the techniques used by the recognizer could just as well be used in recognizing off-line input data. In other words, the digitized data 106 might also be generated by a scanner scanning a handwritten document and having the scanned image digitized by a digitizer, such as digitizer 104 and stored as X-Y points on trajectories of handwritten characters as digitized data 106.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
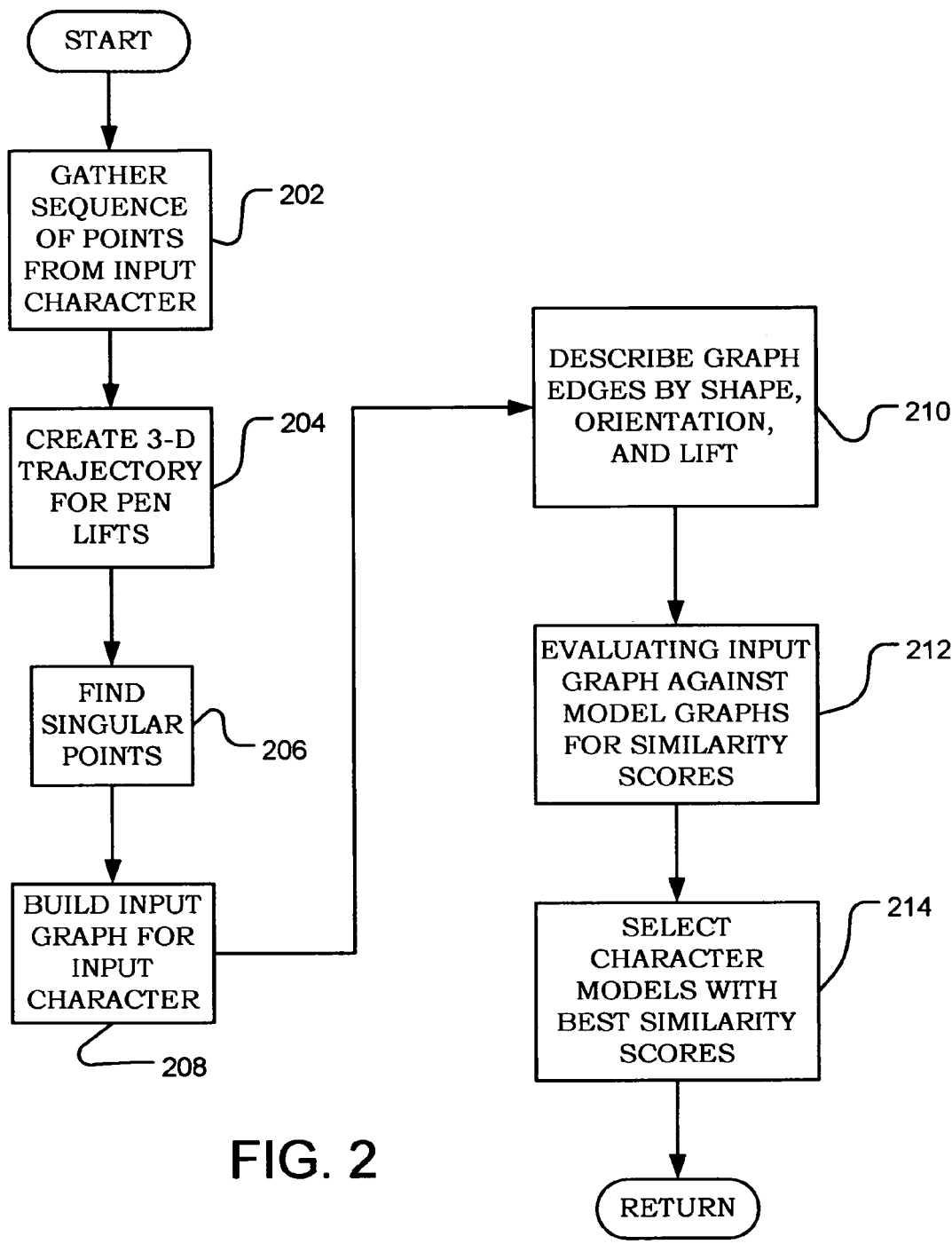
FIG. 2 shows one preferred embodiment of the operational flow for the online character recognizer.

FIG. 2 illustrates an operational flow for the character recognizer 112 according to one preferred embodiment of the recognizer. The operations performed in FIG. 2 will be described with reference to a word example "tone" shown in FIG. 3, an example of a segmented character "t" in FIG. 4 from the word in FIG. 3, and an example of an input graph (described hereinafter) in FIG. 5 for the input character "t" of FIG. 4.

Figure 3:
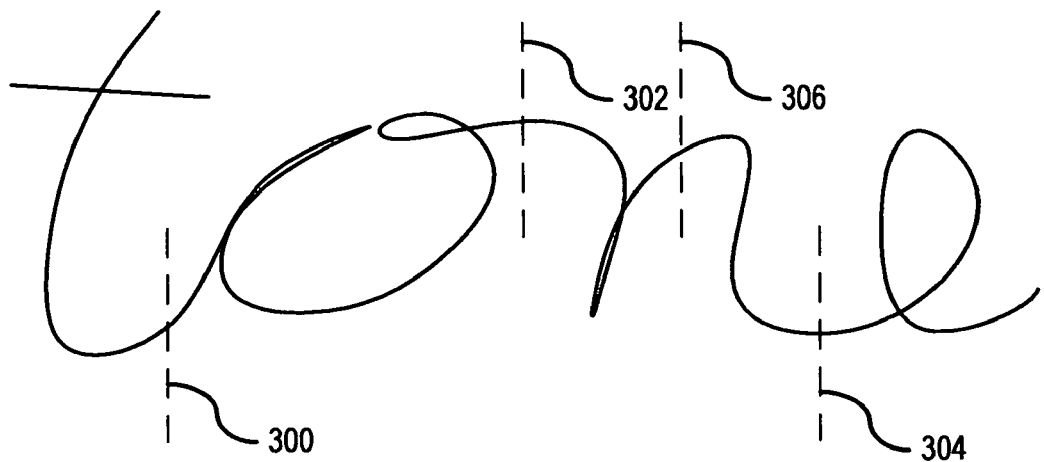
FIG. 3 shows an example of a handwritten word "tone" whose characters are to be recognized.

In FIG. 3 the example word "tone" is shown handwritten with segmentation points 300, 302, and 304. Of course, the segmentation process may choose other segmentation points such as segmentation point 306. Segmentation point 306 might be in addition to or in lieu of segmentation point 304. For example, if only segmentation points 302 and 304 are used, then the last two characters will be "ne". If segmentation point 306 is used in lieu of segmentation point 304, then the last two characters will be "vu". Finally, if all three segmentation points 302, 304, and 306 were used, the last two characters might be interpreted as three characters "vie". Each of these character possibilities can be processed, and after character recognition occurs for each segmentation possibility, a word recognition process would be performed by the character recognition data user 118 in FIG. 1.

Figure 4:
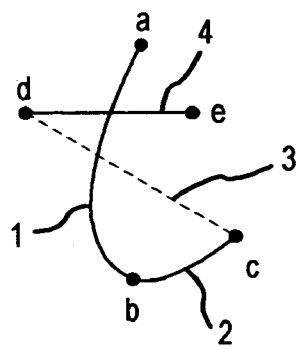
FIG. 4 shows the character "t" segmented from the word "tone" in FIG. 3 and the singular points and trajectory segments between the singular points that make up the character.

For purposes of describing the operations in FIG. 2 we will assume that the input character is the handwritten character "t" shown in FIG. 4—the first segmented input character from FIG. 3. In FIG. 2 the gather operation 202 retrieves from digitized data 108 (FIG. 1) a sequence of X-Y location points that trace the trajectory of the input character. In this example gather operation 202 gathers or retrieves all of the X-Y points making up the character "t" shown in FIG. 4.

In FIG. 4 the letter "t" is made up of singular points, or significant points, which include a beginning point of a character stroke, an end point of a character stroke, and curvature points during a stroke of the character where the trajectory of the character changes significantly. In FIG. 4 the letter "t" has five singular points—a (beginning point of a first stroke), b (curvature point), c (end point of the first stroke), d (beginning point of a second stroke), and e (end point of the second stroke). The sequence of X-Y points between these singular points form the trajectory segments of the character. Thus, in FIG. 4 the alphabetic letter "t" has trajectory segment 1 between singular points a and b, trajectory segment 2 between singular points b and c, trajectory segment 3 between singular points c and d, and trajectory segment 4 between singular points d and e.

Trajectory segment 3 is a pen lift trajectory between singular point c where the letter "t" was segmented and singular point d, the beginning of the cross stroke, which is also trajectory segment 4. Of course, when the word "tone" in FIG. 3 was handwritten, the cross stroke of the "t" was not performed until after the entire word was written. However, for purposes of performing the character recognition the cross stroke—trajectory segment 4—will be processed as if the pen lift occurred at the singular point c and pen landing occurred at singular point d, the beginning of the cross stroke for the "t".

Create operation 204 creates a predetermined three-dimensional trajectory segment for the pen lift from point c to point d in FIG. 4. The trajectory shape is defined simply as a rise followed by a drop, i.e. a triangular trajectory out of the X-Y plane along the path from pen lift point to pen landing point. Accordingly, the create operation 204 will create one trajectory for the pen lift trajectory segment 3 in FIG. 4.

Find operation 206 in FIG. 2 locates the singular points in the character. As mentioned above, there are five singular points in the character "t" in FIG. 4. Point a is the beginning singular point for a first stroke at the beginning of the "t", point b is a singular point, where there is a significant change in the trajectory of the first stroke from down to up, and point c is a singular point as it is the end point of the first stroke. Point d is a singular point as it is the beginning of the second stroke of the character, and point e is the end singular point for the character for the second stroke of the character. The change in trajectory at point b may be determined a number of ways as by measuring the approach trajectory and departure trajectory at each point along the trajectory of the character. Another possibility would be measuring the angle of tangent at each point and looking for a significant change in direction of the tangent from a previous point or to the next succeeding point. Another possibility would be to look for a maximum or minimum point in the trajectory of a stroke.

With the singular points identified and the trajectories between singular points known, build operation 208 builds an input graph for the input character. The input graph for the input character is defined as follows. There is a node in the graph for each singular point in the input character. There is an edge depicted as a line connected between nodes; the edge represents the trajectory between the singular points represented by the nodes.

Figure 5:
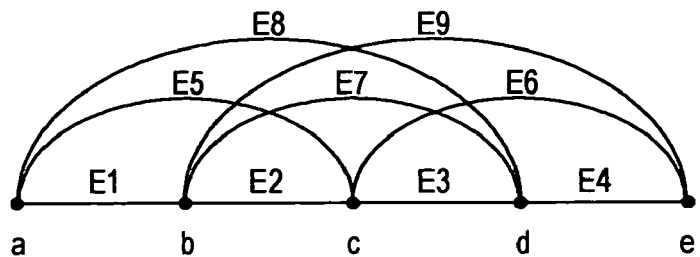
FIG. 5 shows an exemplary input graph for the character in FIG. 4.

For example, in FIG. 5 there is an illustration of a possible input graph for the input character "t" in FIG. 4. The first order graph is represented by edge E1 connecting nodes a and b, edge E2 connecting nodes b and c, edge E3 connecting nodes c and d, and edge E4 connecting nodes d and e. These edges contain values representative of the trajectory segment that they correspond to in FIG. 4. For example, edge E1 corresponds to the trajectory segment 1 in FIG. 4, and edge E2 corresponds to the trajectory segment 2 in FIG. 4. These trajectory segments between singular points also may be referred to as edge trajectories to distinguish them from the character trajectory for the entire character.

A second order edge in FIG. 5 would be edge E5 between nodes a and c, edge E7 between nodes b and d, and edge E6 between nodes c and e. In other words, a second order edge corresponds to an edge or trajectory segment containing two first order trajectory segments. For example, edge E5 contains values representative of the serial combination of trajectory segments 1 and 2 in FIG. 4.

Lastly, the input graph in FIG. 5 contains two third order trajectories. A third order trajectory is a combination of three single order trajectory segments. Thus, third order trajectory segment E8 contains values representative of trajectory segments 1, 2, and 3 in FIG. 4, and edge E9 contains values representative of trajectory segments 2, 3, and 4 in FIG. 4.

Not all edges will be accepted as will be described hereinafter. Some edges represent combinations of trajectory segments that are too complicated to be useful in recognizing the character. For example, it is probable that edge E8 and edge E9 may not be used as the trajectories they represent are such complex shapes.

The input graph in FIG. 5 represents possible descriptions of the character "t" in FIG. 4. Each description is a path through the input graph from node a to node e. Thus the single order path is E1, E2, E3, E4. A second order path might be E1, E7, E4, or it might be E5, E6, or E1, E2, E6, or E5, E3, E4. Any of these paths might be used as a description of the character "t" for later processing and recognition of the character. Of course, a path E8, E4 could also be used, or a path E1, E9 could be used, but as mentioned above, the combined trajectories for edges E8 or E9 are probably too complex to be useful.

Returning again to FIG. 2, now that an input graph of the input character has been built it is necessary to describe the edges E1 through E9 for subsequent use in recognizing the character. The edge values used in this embodiment of the invention are shape, orientation of the shape, and lift. Lift refers to a value that indicates the percent-of-air portion of a trajectory, i.e. pen lift, off of the writing surface for the trajectory being valued. The describe graph edges operation 210, that determines the shape, orientation and lift values for each edge, is described hereinafter with reference to FIG. 8.

After each edge in the input graph has shape, orientation, and lift values assigned to it, the operation flow proceeds to evaluate operation 212. Evaluate operation 212 is looking for a similar path in both the input graph and various character model graphs. There is a model graph for each and all typical characters against which the input character is being evaluated. These model graphs are stored in the character descriptions database 114 in FIG. 1. The creation of these character model graphs will be described hereinafter with reference to FIG. 11.

Evaluate operation 212 evaluates the input graph against each character model graph. The evaluate operation 212 is described in more detail hereinafter with reference to FIG. 9. The evaluate operation finds the best match (highest similarity score) comparing corresponding edges of substantially similar paths through the input graph and model graphs. The best similarity score between the input graph and the model graph is stored until all models have been evaluated against the input graph. Select operation 214 then selects the character model with the best similarity score for a path as the recognition answer for the input character. This character recognition answer is stored with a similarity score value for subsequent use by the character recognition data user 118 in FIG. 1. The data user 118 will use the character recognition data 116 to ultimately recognize the word in which the character appears. With this overview of the operations performed by a preferred embodiment of the invention in mind, the more complex operations in FIG. 2 will now be described in detail.

Figure 6:
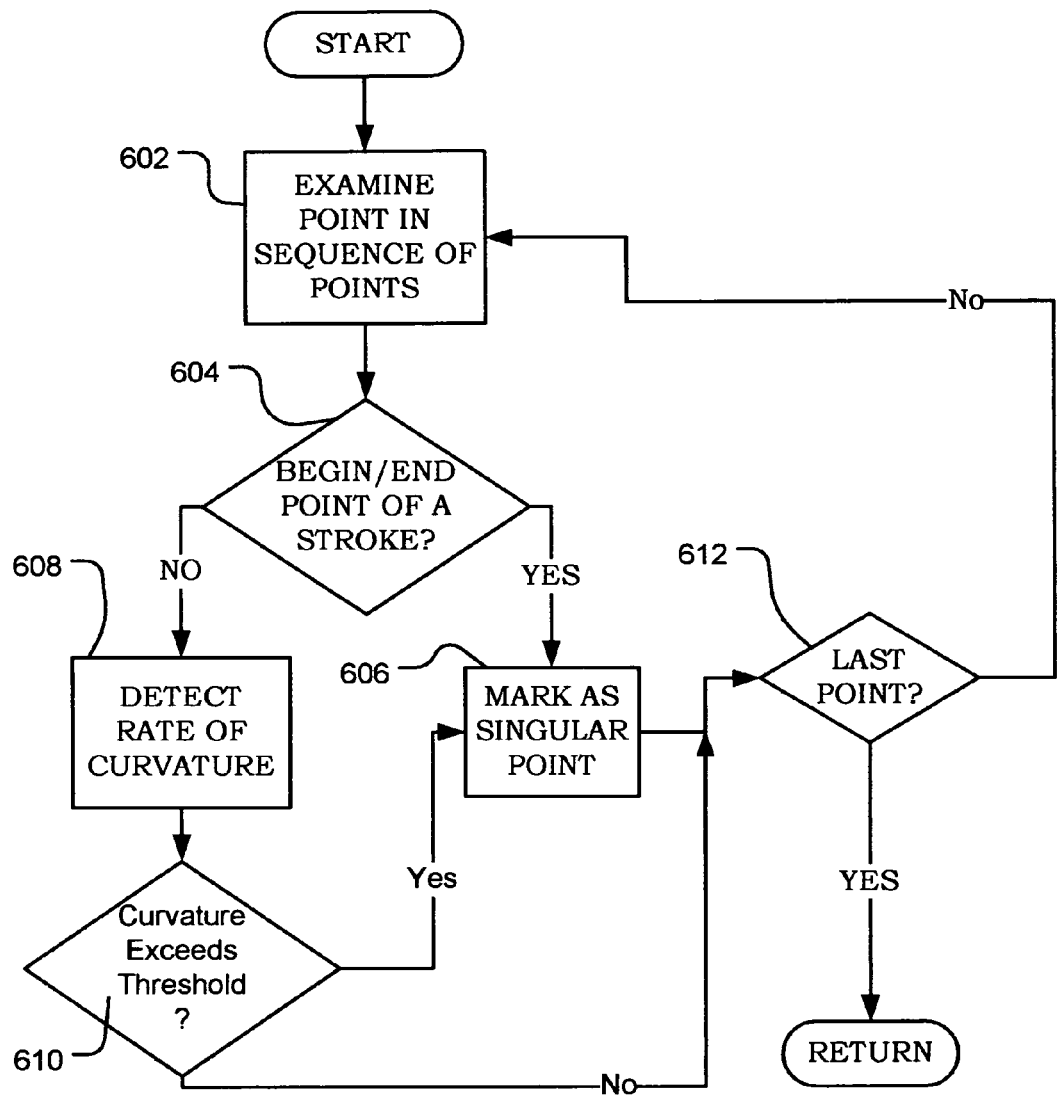
FIG. 6 shows one embodiment of the find singular points operation 206 in FIG. 2.

FIG. 6 illustrates one embodiment of find operation 206 as it identifies and marks the singular points in the input character trajectory. The operation flow begins with examine operation 602 sequentially examining each point in the sequence of points making up the trajectory of the input character. The first point examined would typically be the begin point of the trajectory, although it could be the end point of the trajectory. Point test operation 604 is testing whether the point being examined is a begin or end point. If it is a begin or end point, the operation flow branches "yes" to the mark operation 606, which marks the point as a singular point. If the point being examined is not a begin or end point, then the operation flow branches "no" to curvature detect operation 608.

Curvature detect operation 608 detects the rate of curvature at the point. This can be done by comparing the angles of straight lines drawn to adjacent points before and after the point under examination. Based on these angles a curvature rate can be determined. Curvature rate test operation 610 tests whether the curvature rate is greater than a threshold value "n". This threshold value is programmable and would be set in a manner to clearly distinguish when a significant change in direction of the trajectory of the character has occurred at the point under examination. If the curvature rate is exceeded, then the operation flow branches "yes" to mark operation 606 and the point under examination is marked as a singular point. If the curvature rate threshold is not exceeded, then the operation flow branches "no" to last point test 612. Last point test 612 is detecting whether more points are to be examined or whether all points along the trajectory of the input character have been examined. If there are more points to examine, then the operation flow branches "no" back to examine operation 602 to examine the next point. If all points have been examined, then the operation flow branches "yes" to return the program flow to the main recognition operation flow.

Figure 7:
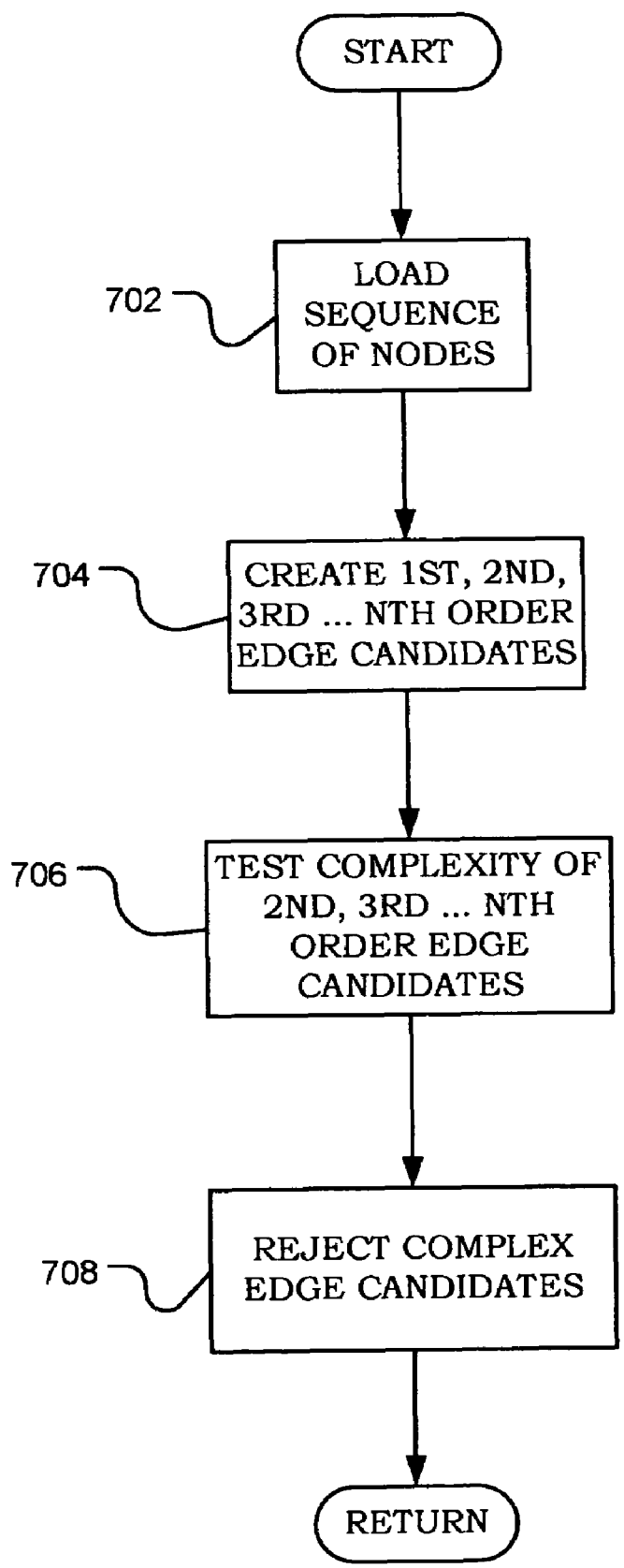
FIG. 7 shows one embodiment of the build input graph operation 208 in FIG. 2.

Build input graph operation 208 in FIG. 2 is shown in detail in the operational flow of FIG. 7. The operations in FIG. 7 begin at load operation 702. Load operation 702 loads the sequence of nodes. The nodes are the singular points determined by find operation 206 as just described in detail in FIG. 6. A node is loaded for each singular point and they are loaded in sequence from the begin point of the character trajectory to the end point of the character trajectory.

Edge candidate create operation 704 creates the edge candidate for the edges between nodes. First, second and third order candidates are created in the preferred embodiment; however, any number of orders of edge candidates could be created. The order of an edge candidate reflects the number of trajectories between nodes. Thus, a first order has one trajectory between each node. A second order trajectory has two trajectories between nodes, i.e. jumps over a node. A third order trajectory has three trajectory segments between nodes, i.e. it jumps over two nodes.

After all of the edge candidates have been created then the candidates are tested for complexity. Complexity test operation 706 evaluates whether the trajectory in the edge candidate is so complex that a shape value is unlikely to be found in trying to describe the edge candidate. If it is determined that the shape of the edge candidate is too complex, then operation 708 rejects the complex edge candidate. The operational flow in FIG. 7 is depicted as a single flow creating all of the edge candidates, testing all of the candidates for complexity and rejecting the complex edge candidates. Of course, this flow could be done in an iterative fashion creating each edge candidate, testing it and accepting or rejecting it before looping back to create the next edge candidate.

Once the edge candidates have been created, describe operation 210 (FIG. 2) will describe each edge according to shape, orientation of the shape, and lift values. The describe operation 210 is shown in more detail in the operational flow of FIG. 8.

Figure 8:
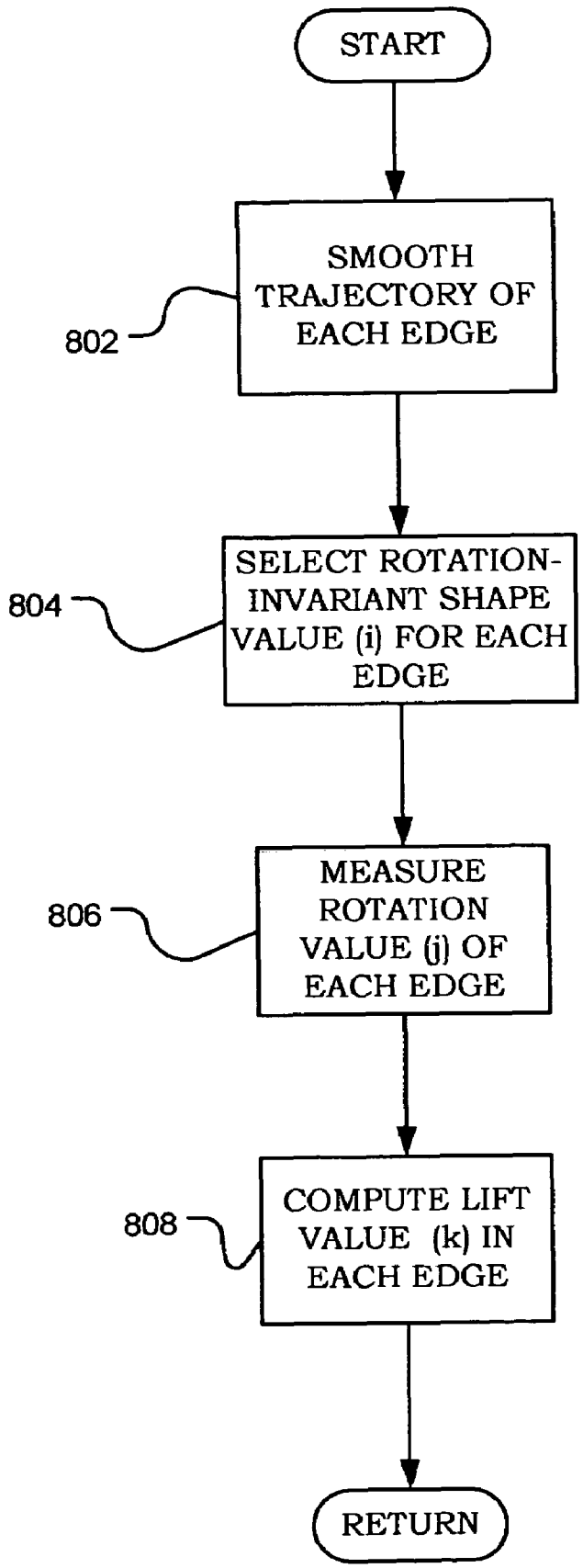
FIG. 8 shows one embodiment of the describe graph edges operation 210 in FIG. 2.

In FIG. 8 the describe edges operational flow begins by finding a smooth transform for the trajectory of each edge. This might be done by taking the three simplest or base cosine coefficients of the transform of the edge trajectory and using that to approximate the edge trajectory. This will have the effect of smoothing the trajectory. After the smooth transform operation 802, shape select operation 804 will compare the shape of the edge trajectory to shapes stored in the descriptions database 114 (FIG. 1). The shape of the trajectory is compared irrespective of the rotation of the shape when compared to the shape stored in the database. Once the shape is selected then a shape value "i" is assigned to the edge.

Measure rotation operation 806 takes the orientation of the shape for the edge and assigns a rotation value "j" for the edge. The rotation of the edge may be found a number of ways but in one preferred embodiment the rotation of the trajectory that the edge represents is found by projecting the trajectory onto a line as the line rotates 360 degrees in fifteen degree increments. At each position of the line each point of the trajectory is projected onto the line. The line on which the positions of projected points have the greatest variance will be the orientation line indicative of the rotation of the shape. The position of the line with greatest variance of projected points can be calculated as main eigenvector of covariance matrix of corresponding piece of trajectory. That edge for that trajectory is then assigned the value corresponding to the orientation of the line.

With the shape and the rotation of the edge defined the remaining value to be determined is the lift. Compute lift operation 808 computes the percentage of the trajectory for the edge that is off the writing surface. If the edge represents a lift trajectory of first order, then, of course, the lift or air percentage will be 100 percent. For trajectories that are the combination of a lift edge with a non-lift edge then the percentage of air or lift will be less than 100 percent. The lift value "k" will simply be a number representing one of eight possible percentages of lift or air. The percentage is computed simply by summing the trajectory of lift with the trajectory that is in the writing surface and then dividing by their combined length. After all of the edge values—shape, rotation, and lift—have been determined for all edges, the operation returns to the main program flow. As shown and described for FIG. 8, the values are computed for all edges in the input graph. This can be done in an iterative process or in a process where all shape values are computed, then all rotation values are computed and, finally, all lift values are computed.

Figure 9:
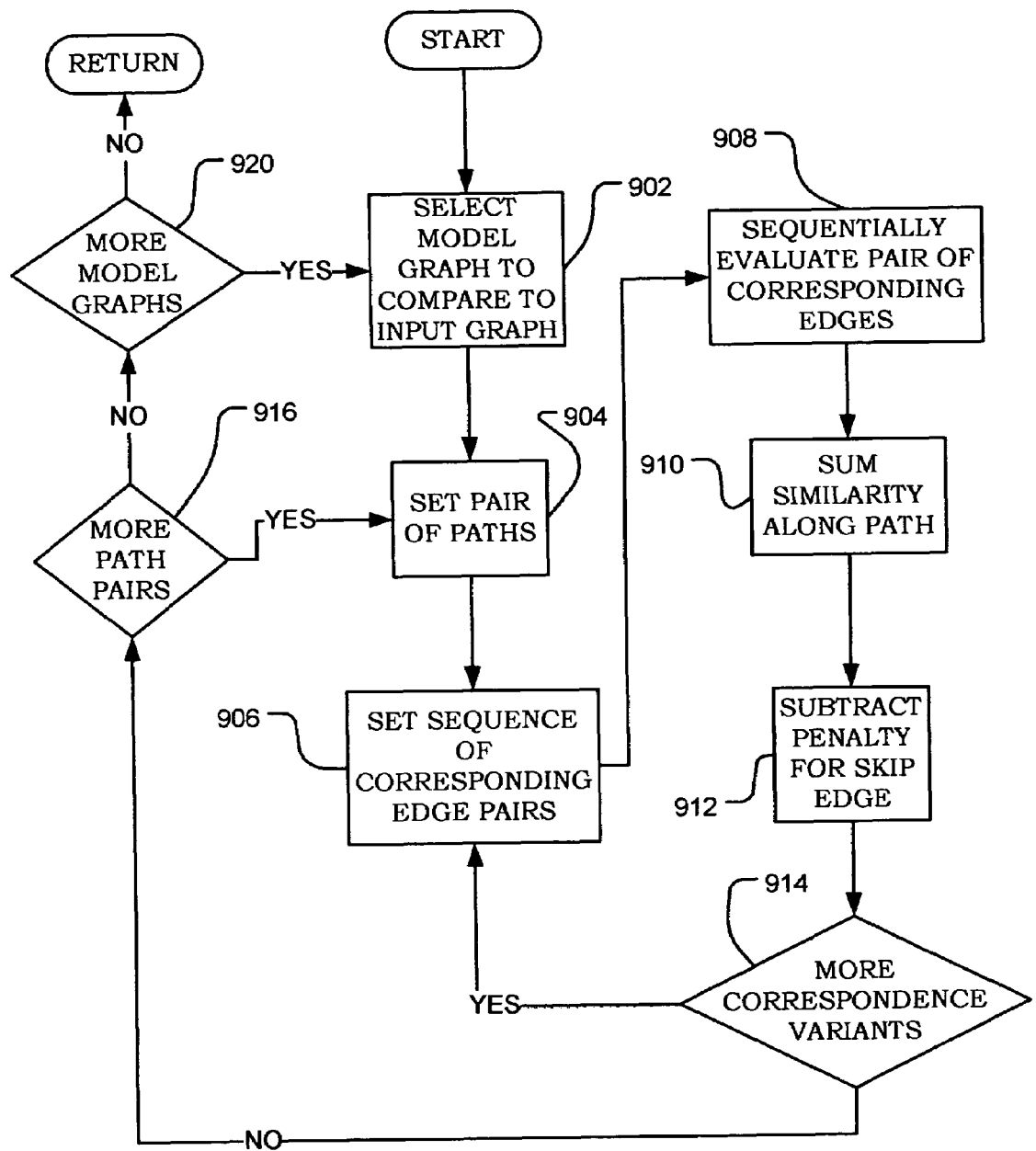
FIG. 9 shows one embodiment of the evaluate input graph operation 212 in FIG. 2.

FIG. 9 illustrates the operational flow for one preferred embodiment of the evaluate input graph operation 212 in FIG. 2. The operational flow begins with load model graph operation 902. There will be a model graph for each alphanumeric character or symbol that is to be used by the on-line character recognizer in recognizing the handwritten input character. Each character model graph has "i," "j," and "k" tables for each edge of the model graph. An example of the i, j, and k tables is shown in FIG. 10. There are 128 entries in the i table 1002, 25 entries in the j table 1004, and 8 entries in the k table 1006. There is a set of these tables for each edge in the model graph for this character. In the i table the i value 0 through 128 assigned to the edge will have stored in its table a similarity value for each i value. The similarity value is a measure of the similarity of shape of the model character trajectory for that edge to a standard shape identified by the i value. As depicted in the table 1002, the 38$^{th}$ shape indicated by i value 38 has a similarity value of 95 for the trajectory of the edge represented by the i table. Likewise, the shapes corresponding to i value 4 have only a similarity value of 18 to the trajectory of the model character edge.

The j table 1004 in FIG. 10 has 25 entries, j value 0 to j value 24. As described above, the j value represents the orientation of the shape of the trajectory represented by the edge. Twenty-four of these entries represent different rotations around 360 degrees spaced at 15 degree intervals. The last entry in the j table, entry 24, as a value for j represents no clear orientation. For example, an "o" or a "0" if nearly round will not have a clear orientation. For each of the j values 0 through 24 there is a similarity value entered in the table. This similarity value, again, represents the similarity of the trajectory represented by the edge to an orientation for that trajectory in a standard model character.

Lastly, the k table 1006 in FIG. 10 represents the lift or air percentage values and has 8 entries, 1 through 8. These entries represent a percentage of air in 12½ percent increments. For each entry in the k table there is a similarity value that indicates the similarity between the air percentage represented by the k value, 1 through 8, to the lift or air percentage of the actual trajectory represented by the edge for the model character. Accordingly, these i, j and k tables for each edge in the model graph are loaded with the model graph values for the i, j, and k parameters for use in evaluating the input graph against the model graph.

After the load operation 902 the set operation 904 selects a pair of paths—one in the model and one in the input graph—for comparison. There will be multiple paths available through each input graph and each model graph. One path from each of the input graph and the model graph is selected at a time for comparison.

Sequence set operation 906 sets the sequence of correspondent edge pairs in the two selected paths to be compared. The sequence will flow from left to right or from first node to last node in the graphs.

Sequential evaluate operation 908 evaluates the corresponding edges or edge pairs. This is accomplished as follows. For each edge pair the edge of the input graph provides i, j, and k values. These values are used to address the i, j, and k table for the corresponding or paired edge in the model graph. The similarity values read from the i, j, and k tables for the i, j, and k value from the input edge are summed. This sum represents a similarity score for the edge pair.

Path sum operation 910 sums the edge similarity scores for all edge pairs along the pair path. The cumulative sum is the path similarity score.

Not all paths paired through the input and model graphs will necessarily have the same number of edges. In effect there is an unbalanced pair path—different number of edges in the paths of the pair. For example, there might be four edges in the model graph and five edges in the input graph. If this occurs, then one of the edges of the input graph will be skipped during the setting of sequence of corresponding edge pairs for comparison. Penalty operation 912 subtracts a penalty in the event that there is a skipped edge during the sequential evaluation of edge pairs. This comes off of the path similarity score to reduce that score. Eventually the goal is to find the highest similarity score for all paths through all model characters as evaluated against the input graph. The best or highest similarity score will then indicate a best candidate as a model character for the identification of the input character.

After there is the adjustment of penalty for skipped edges, then test operation 914 tests whether there are more correspondent variants. In other words, are there more variations on skipped edges that should be evaluated? If there are more skipped edge variants, then the operation flow loops back to set sequence of edge pairs operation 906. In this return to set sequence the edge that is skipped is shifted in sequence from the previous sequential evaluation. The evaluation 908, 910, 912 is repeated and the loop of trying different corresponding edges for the skipped edge is repeated until all positions have been tried. Once all correspondent variants of the skipped edge have been tried, the operation flow branches "no" to more path pairs test 916. If not all the path pairs between the input graph and model graph have been tried, then the operation flow branches "yes" to return the flow to pair path set operation 904. The pair path set operation then selects a new pair of paths, one in the input graph and one in the model graph, for comparison. The operation flow then proceeds to the set sequence for edge pairs and the evaluation loop for this pair path repeats until all variations for skipped edges have been completed. The operation flow then returns to the more path pairs test operation 916 to determine if there are more path pairs to be evaluated.

One could evaluate all possible path pairs, but this would be extremely burdensome. Alternatively, dynamic programming may be used to accomplish the equivalent of a comparison of all the path pairs and, simultaniously, of all sequences of correspondent edge pairs for each path pair. Dynamic programming is described in the above referenced publication of by I-John Lin and S. Y. Kung (IEEE Transactions on Signal Processing, 45(11):2701-8, November 1997. This publication describes how dynamic programming can be used to find a best path (highest similarity score) through the input graph and model graph.

When all selected path pairs have been evaluated the operation flow branches "no" from test operation 916 to more model graphs test operation 920. This would occur when testing or evaluating of the input graph against a particular model graph has been completed. If there are more model graphs to be evaluated against the input graph, the operation flow branches "yes" from test operation 920 to the load operation 902 to load the next model graph. The evaluation of that model graph against the input graph will cycle through until all of its pair paths and corresponding edge pairs have been evaluated. When the comparison of that model graph against the input graph is complete the operation flow returns to more model graph test operation 920. If all model graphs have been tested against the input graph, then the evaluation of the input graph is complete and the operation flow branches "no" to return to the main program flow.

The number of model graphs used and the creation of the i, j, k tables for each edge in each model graph can be created by just inputting a number of reference characters and collecting the data. However, the number of possible models and the amount of data collected is quite large. Therefore, it is useful to adopt an operation to create the model graphs that will reduce some of the redundant information and reduce the number of models that must be compared to an input graph. The operations in FIG. 11 show one preferred embodiment for creating the model graphs for reference characters.

Figure 11:
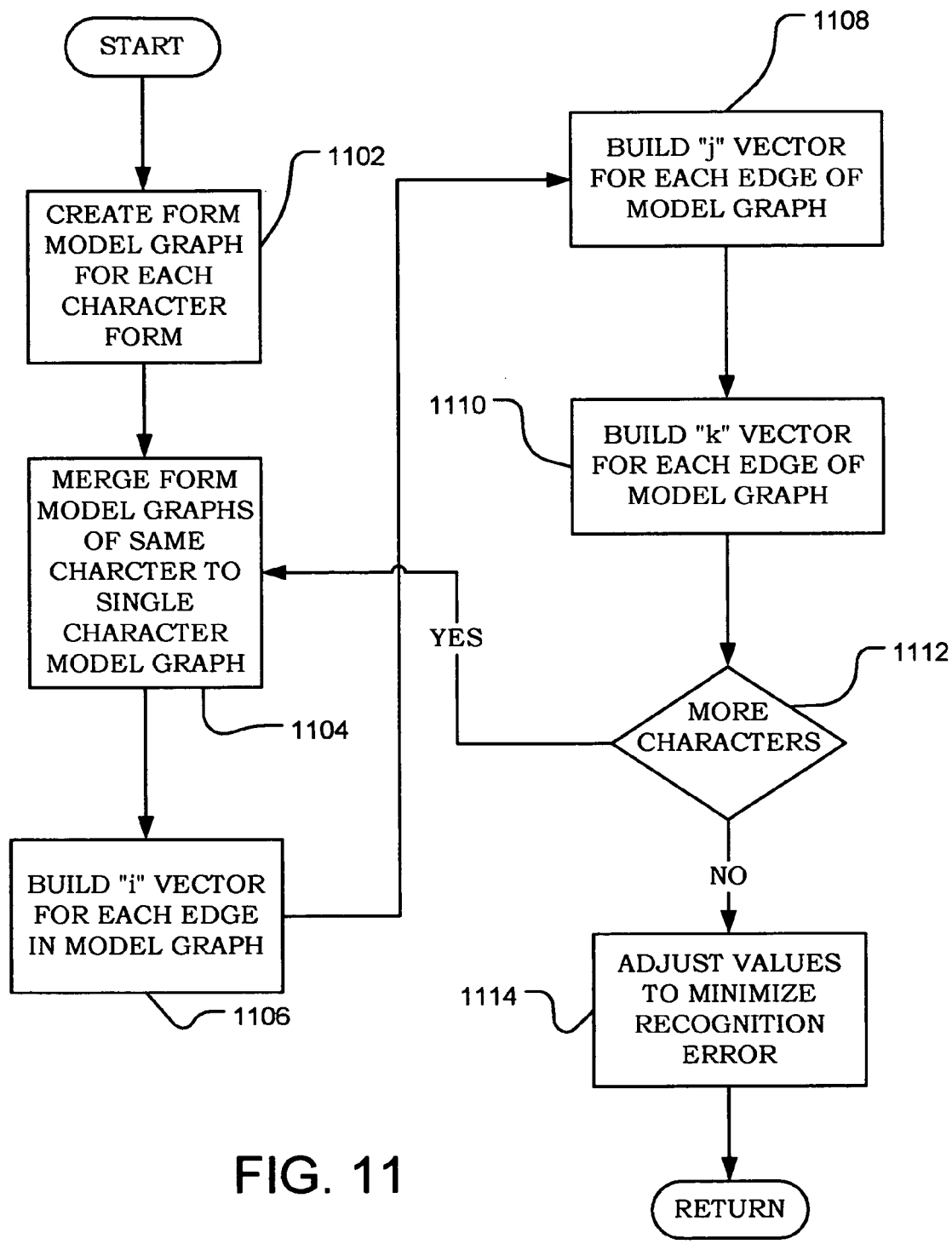
FIG. 11 shows one embodiment of the operational flow for creating a model graph.

Operation 1102 in FIG. 11 begins the operational flow by creating a model graph for each character form of the same character. To reduce the number of model graphs the character form chosen for graphing is a standardized character. A standardized character is a typical handwritten script shaped character that has a high frequency of use. In other words, all characters will be present but unusually shaped characters that are rarely written, or written only by few individuals, will not be modeled.

Another reduction in model graphs can be accomplished by merging model graphs of different forms of the same character to a single model graph for the reference character. For example, the character "a" might be written in various ways. Some typical examples of handwritten "a"s are shown in FIG. 13. Each of these typical character "a"s will have a form model graph created for them by create model graph operation 1102. Merge model graph operation 1104 will take all four of the form model graphs for these four typical alphabetic letter "a"s and merge them into a single model graph for the character "a". This is accomplished by combining redundant edges at the beginning of the model graph or at the end of the model graph. The criterion for combining edges to merge form model graphs into a model graph for the same reference character is (1) minimize the creation of new paths through the model graph, and (2) add new paths so as to not lose any significant information in the merged path by merging common redundant edges at the beginning of the graph and at the end of the graph. The size of the model graph for all forms of the reference character can be kept to a reasonable size.

Once the merged model graph operation is completed then operation 1106 will build the i table for each edge in the model graph. This is accomplished by comparing the trajectory segment, or edge trajectory, represented by each edge to the standard shapes and assigning a similarity value for the shape value i for that edge. The build j table operation 1108 will compare the orientation of the trajectory segment for each edge to 24 possible orientations and enter a similarity value for each rotation value j. This is accomplished for each edge of the model graph. After the j table is built, then build operation 1110 builds the k table for each edge in the model graph. For each lift value k, a similarity value will be loaded in the k table representing the similarity of lift or air percentage of the trajectory segment represented by the edge to a lift percentage for that trajectory segment.

After the i, j, and k tables have been built for each edge of the model graph, the more characters test 1112 detects whether additional characters need to be modeled. If there are more characters to be modeled, then the operation flow returns to merge model graphs operation 1104 to merge the model graph of another set of the same character form model graphs. The building of the tables for each edge in the model graph for a reference character are repeated, and the flow returns to the more characters test operation 1112. When all characters have been modeled, merged into a model graph for the same character, and the i, j,k tables built, then the creation of the tables or vectors for the model graphs is complete. The operation flow then branches "no" from test 1112 to adjust similarity values operation 1114. The adjust similarity values operation is performed to minimize a recognition error and optimize the differentiation between models as used to recognize input characters. Once the adjustment of similarity values for all of the i, j, and k tables for all of the model graphs is completed then the operation flow returns to the main program flow.

Figure 12:
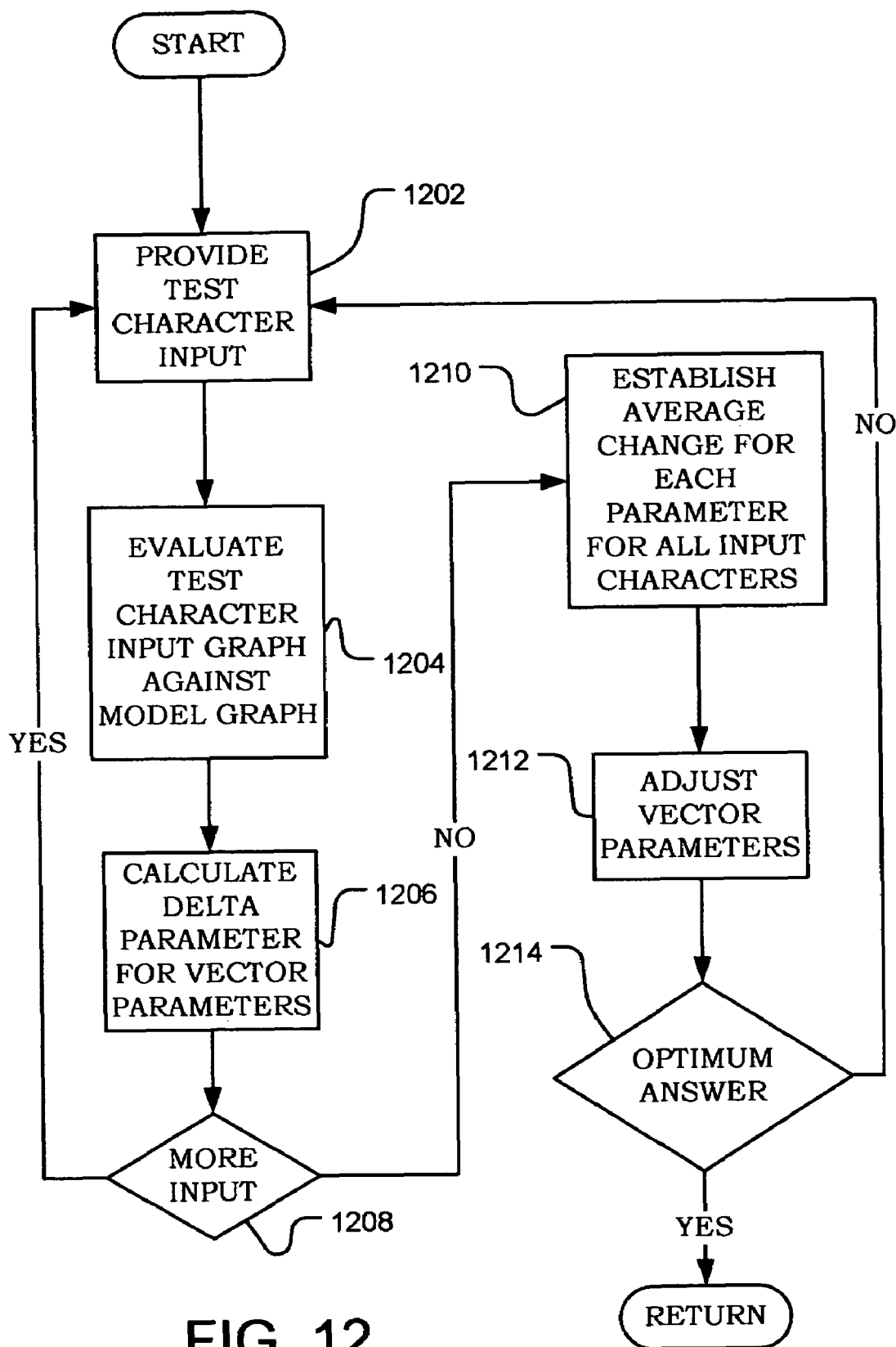
FIG. 12 shows one embodiment of the adjust values operation 1114 in FIG. 11.

FIG. 12 illustrates one preferred embodiment for the adjust similarity values operation 1114 (FIG. 11). The adjustment begins at test character input operation 1202. Operation 1202 provides a test character input graph. Evalulate operation 1204 then calculates a combined similarity score for the test character input graph evaluated against the character model graph. The test characters are selected to enable the creation of model graphs to learn how to set values in i, j, and k tables to better distinguish between input characters. After the test character input graph is evaluated against the model graph, the similarity values in the i, j, and k tables are changed. Test character input test operation 1208 tests whether there are more test characters input graphs for the same character to be evaluated against a character model. If there are more test character input graphs then the operation flow returns to provide operation 1202 to enter the next test character input graph. After all test character input graph variations have been entered, and all delta parameter variations have been tried the operation flow branches "no" from more input test operation 1208 to establish average operation 1210.

Establish average operation 1210 averages the change for each similarity value for all of the test input characters applied against the character model graph. This average change is then used by adjust parameters operation 1212 to adjust the similarity values in the reference character model graph i, j, and k tables. Optimum answer test operation 1214 causes the operational flow to enter a reiterative loop to run the tests and adjustments again until a final character answer is less certain, i.e. the best path similarity score for the test character decreases from a peak value. When this occurs the similarity value parameters are adjusted back to the values that produce a peak value for the best path similarity score. The adjustment values operational flow in FIG. 12 is completed, and the operational flow branches "yes" from test operation 1214 to return to the main program flow.

Figure 14:
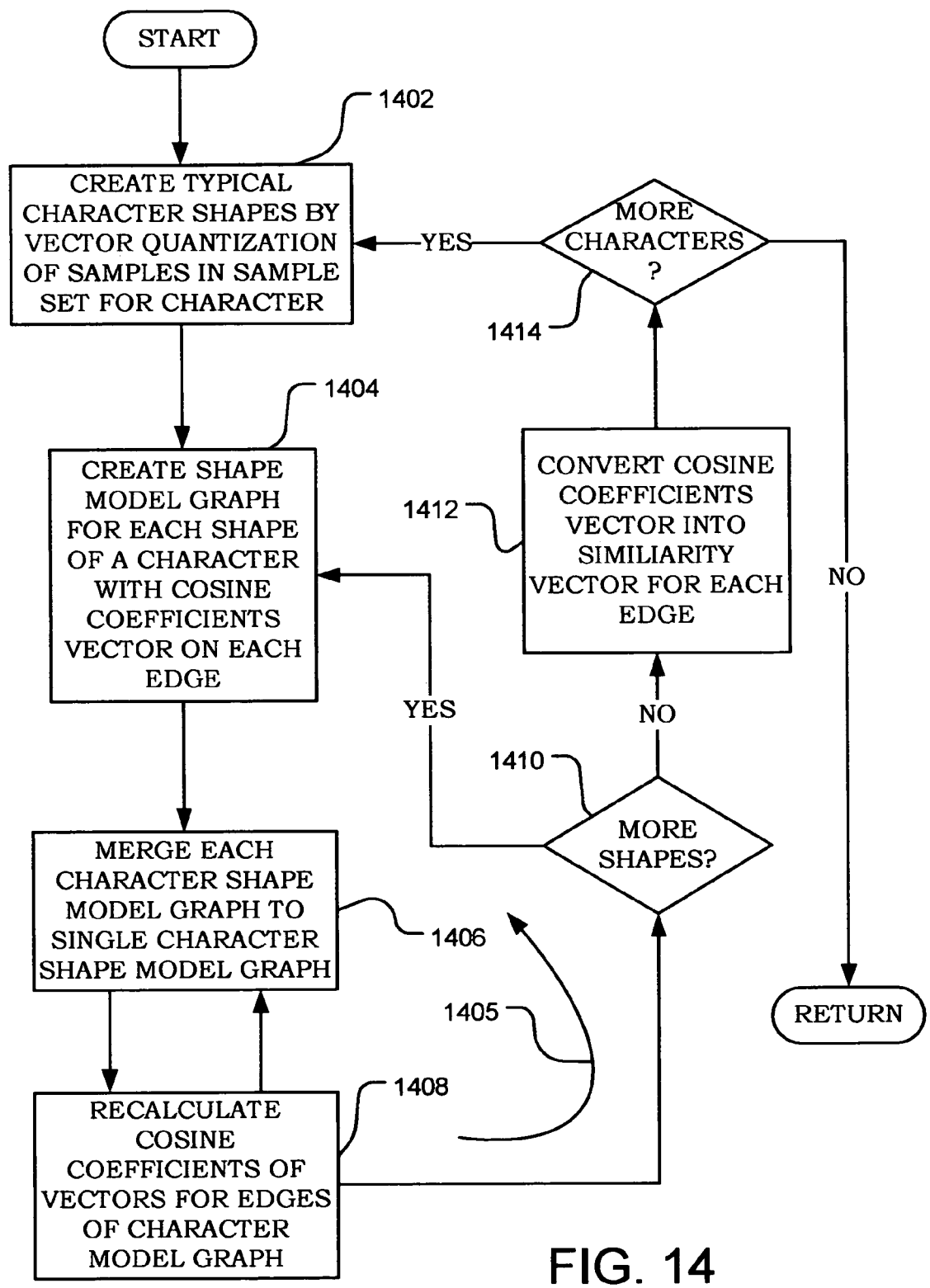
FIG. 14 shows another embodiment of the operational flow for creating a model graph.

FIG. 14 shows another preferred embodiment for the operational flow for creating model graphs for the character descriptions database 114 (FIG. 1). This embodiment is an alternative to the embodiment for creating model graphs shown in FIG. 11. In FIG. 14, create shape operation 1402 creates a prescribed number of typical character shapes for a reference alphanumeric character or symbol. The number of typical character shapes per character may be about 40 for example, but any number of shapes may be selected by the designer of the system. To control the number of character shapes used in the model, unusual or rarely used character shapes are not included. This might arise where a writer has a particularly unusual style of writing for a character that is quite distant in appearance from the common shapes and is rarely used by other writers.

The typical character shapes are created by create shapes operation 1402 using vector quantization. For each character, create shapes operation receives a set of handwritten samples of the characters, i.e. sample character trajectories. Each sample trajectory is described by a corresponding vector of cosine coefficients. These sample vectors may be clustered by a k-means algorithm of vector quantization, based on Euclidian distance between vectors. This algorithm for vector quantization finds the center of a cluster of vectors for similar sample shapes and then restores a trajectory corresponding to a vector at that center representative of all sample trajectories in the cluster.

In this embodiment hundreds or even thousands of character shape vectors are clustered into 40 clusters. Once the center of each cluster is determined, a vector representing that center is found, and a character trajectory representing all character trajectories in the cluster is restored from the vector. As discussed above, a system designer might choose to use more than 40 clusters or fewer than 40 clusters. After creating all typical shapes we create a character model graph by cycling through loop 1405, i.e. operations 1404-1410, for each typical shape of the character.

In the embodiment of FIG. 11, three vectors of discrete-valued parameters (shape, orientation and pen-lift) were used to describe edges in the model graph. In the create shape model graph operation 1404 in FIG. 14, the parameters for the edges are cosine coefficients so the edges are initially described by a vector of cosine coefficients calculated for the typical shape of the trajectory segment associated with the edge.

Create shape model graph operation 1404 receives a trajectory restored from cosine coefficients vector representing one of the shapes from create shape operation 1402. The character trajectory is broken into trajectory segments. The shape model graph is created for this character trajectory like the exemplary input graph in FIG. 5, but this time the edges are initially represented by a vector of cosine coefficients for each segment and thus each edge.

After the shape model graph for current shape is created, merge operation 1406 merges this shape model graph with already existing character model graphs built on the basis of previous typical shapes. If this is a first typical shape then there is no merge operation 1406. In recalculate operation 1408, the model graph created for this first typical shape is considered to be the first draft of a character model graph, and the operation flow proceeds to more shapes test operation 1410. More shapes test operation detects that there are more typical character shapes created by create shape operation 1402 and returns the operation flow to create shape model graph operation 1404.

Create shape model graph operation 1404 repeats to produce a new model graph. Merge operation 1406 now operates to merge this new model graph into the existing model graph. The main idea behind this merger of model graphs is the following. Each full path in a shape model graph is an alternative description of this shape, and all full paths of all shape model graphs constitute a set of alternative descriptions of the character. This data is compressed by this merger as much as possible without losing essentially different alternative descriptions and without creating essentially new ones. For this purpose similar beginnings and endings of different descriptions are merged using dynamic programming algorithm which recursively calculates similarity scores for all pairs of beginning parts of two graphs (beginning subgraphs) and for all pairs of ending parts of two graphs (ending subgraphs). A beginning subgraph contains a node of the corresponding parent graph, from which the subgraph is formed, and contains all paths between this node and the beginning node of this parent graph. Likewise, an ending subgraph contains a node of the corresponding parent graph, from which the subgraph is formed, and contains all paths between this node and the ending node of this parent graph. Similarity score for two subgraphs in this case is defined as min-max similarity score on pairs of paths from these subgraphs. This means that for each path of one subgraph we choose the most similar path in another subgraph (with the maximum similarity score with given path in the first subgraph) and then we take the minimum of such scores over all paths in the first subgraph. Similarity score of two paths is defined in the same way as in the process of evaluating the input graph against model graph (see description of FIG. 9), i.e. the sum of similarity scores of pairs of corresponding edges minus penalty for skipped edges for the best variant of skipping excess edges. Unlike the process described in FIG. 9, similarity score of a pair of corresponding edges is determined by Euclidian distance between corresponding vectors of coefficients.

The merging algorithm subsequently compares first beginning subgraphs (i.e. subgraphs determined by the starting node and some other node in each of two graphs being merged) and then ending subgraphs (determined by the ending node and some other node in each of two graphs); in both processes pairs of subgraphs are regarded in increasing order, and the similarity score of each pair is calculated with the use of dynamic programming algorithm. Pairs of subgraphs with similarity score exceeding the predetermined tolerance threshold are identified, and their corresponding nodes and edges are merged. Each time, when a pair of edges is merged into one edge, the recalculate cosine coefficients operation 1408 takes place. This operation ensures that each edge in the resulting merged graph is assigned an average (over all edges that have been merged into this edge) vector of cosine coefficients. Any node or edge of any two model graphs, which hasn't been merged into a node or an edge of another graph, is added to the resulting merged graph in such a way that ensures preservation of all different paths (to the extent of the predetermined similarity threshold) and prevents the appearance of essentially new paths (to the extent of the same threshold). The predetermined similarity threshold for merger is a matter of design choice; for higher thresholds we will have larger (less compressed) resulting graph, but with more exact description of variations in our typical shapes.

After merger and recalculation the operation flow again passes to more shapes test operation 1410. If there are more character shapes to be processed, the operation flow again returns to create shape model graph operation 1404. This operational loop continues until all typical character shape model graphs for a single character are recurrently merged into a single character shape model graph.

After all character shapes for a character have been processed into a single character shape model graph, the operation flow branches from test operation 1410 to convert operation 1412. Convert operation 1412 converts the cosine coefficient vectors for each edge in the model graph to three "i, j, and k" similarity vectors for each edge. The similarity vectors (similarity tables in FIG. 10) are created for each of three discrete-valued parameters of model graph edges—shape, orientation and pen-lift. The length of each table coincides with the number of all possible values for corresponding parameter; each position in a table corresponds to a certain value of this parameter and a number assigned to this position is an estimation of similarity of given edge of character model graph and any input trajectory element with corresponding value of given parameter. For example, the shape "i" parameter similarity estimation is based on rotation-invariant distance between cosine coefficients vector of a model graph edge and cosine coefficients vectors representing 128 predefined "typical shapes" of input trajectory elements.

After the conversion of the cosine coefficients vectors to similarity vectors, more characters test operation 1414 detects whether there are more characters for which a character shape model graph must be created. If there are more characters, than operation flow branches back to create shape operation 1402. Now the create shape operation begins to create character shape vectors for a new character. When a character shape model graph exists for all characters, the operation flow branches "no" from test operation 1414 and returns to the main control program flow.

Figure 15:
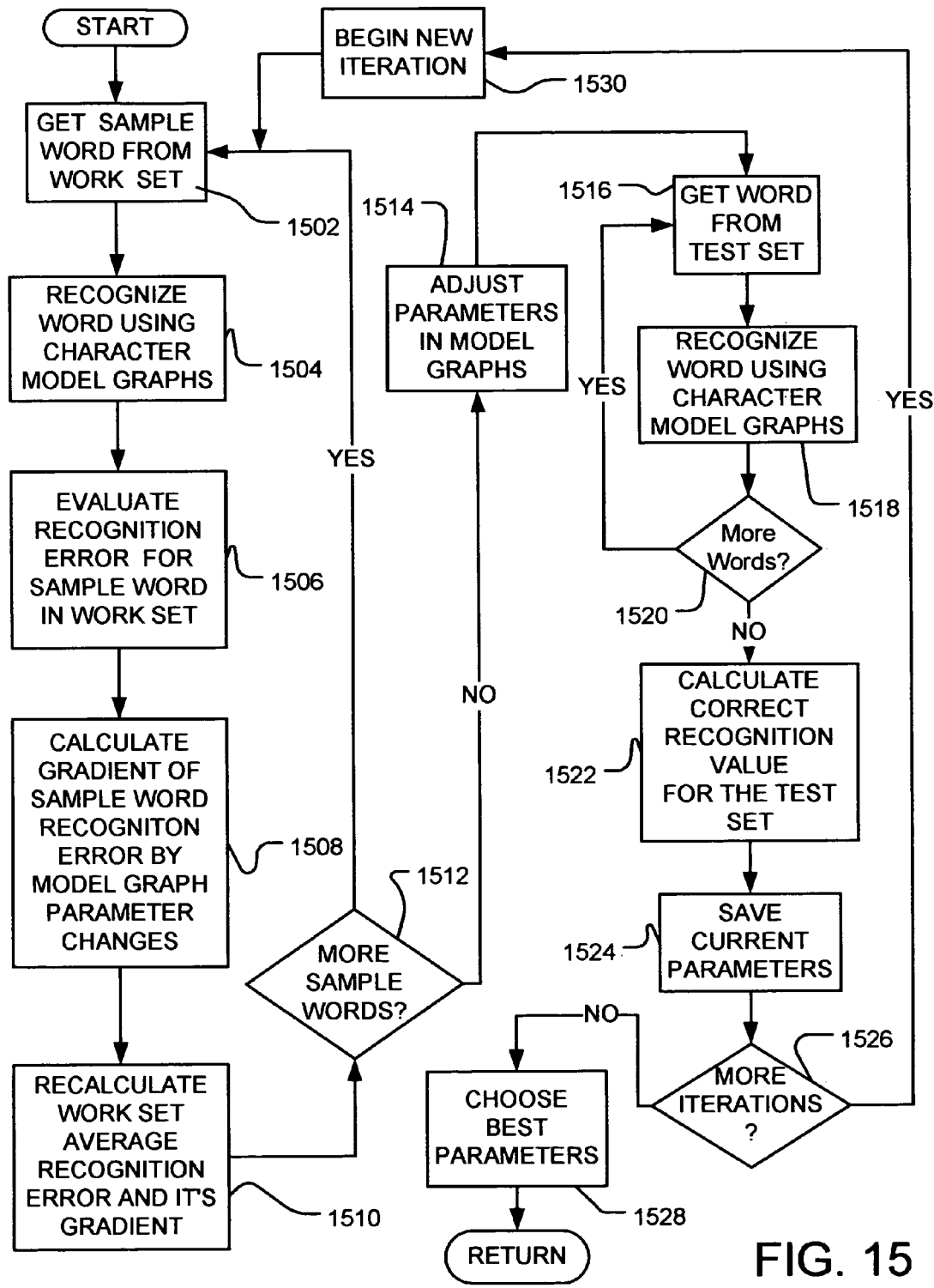
FIG. 15 shows the operational flow for adjusting parameters in the model graphs created by the operations in FIG. 14.

FIG. 15 illustrates the operational flow for adjusting the character model graphs created in FIG. 14 which in effect trains the recognizer (FIG. 2) using the model graphs. The character model graphs are adjusted by using work sample word inputs and test sample word inputs to adjust parameters of the character model graphs to produce optimum recognition results. The FIG. 15 embodiment for adjusting the model graphs used in the recognition operation is an alternative to the embodiment in FIG. 12 for adjusting the model graphs.

The operational flow loop 1502-1512 and back to 1502 in FIG. 15 calculates an average error function and it's average gradient over a given set of work sample words and yields values for the parameters of the model graphs for the work sample words. We use a particular form of error function for this sample set; it is a smoothed step function, which is close to 1 if there is an incorrect answer with recognition score (confidence) greater than correct answer score, and close to 0 otherwise. Thus, the average value of this error function over a sample set is a smooth approximation of the percent of incorrectly recognized words in this set.

In FIG. 15 the operational flow begins at get operation 1502. The get operation retrieves a sample word from a large number of sample words in a work sample set of tens of thousands of words. A "sample word" includes both an input trajectory for an entire word, for example the trajectory for "tone" as shown in FIG. 3, and correct word as a sequence of ASCII codes, for the example in FIG. 3 the ASCII code for "t", "o", "n", and "e". Thus, the training process will be working with character trajectories segmented from the input word trajectory, but at the same the training process can compare its recognition answers against the correct word identified in the correct word ASCII codes.

Recognition operation 1504 uses the character model graphs created in FIG. 14 and the similarity vectors for their edges to recognize characters in the sample word trajectory and to provide a best answers list. For example, the word is recognized by segmenting the word trajectory into characters at alternative segmentation points and then recognizing the characters and their variations to produce alternative word answers. The recognition process associates a score or a confidence value with each recognized word answer to arrive at the best answers. While the ten best answers might by used, any number of best answers could be used to make up the best answer list. The recognition operation is shown and described now with reference to FIG. 16.

Figure 16:
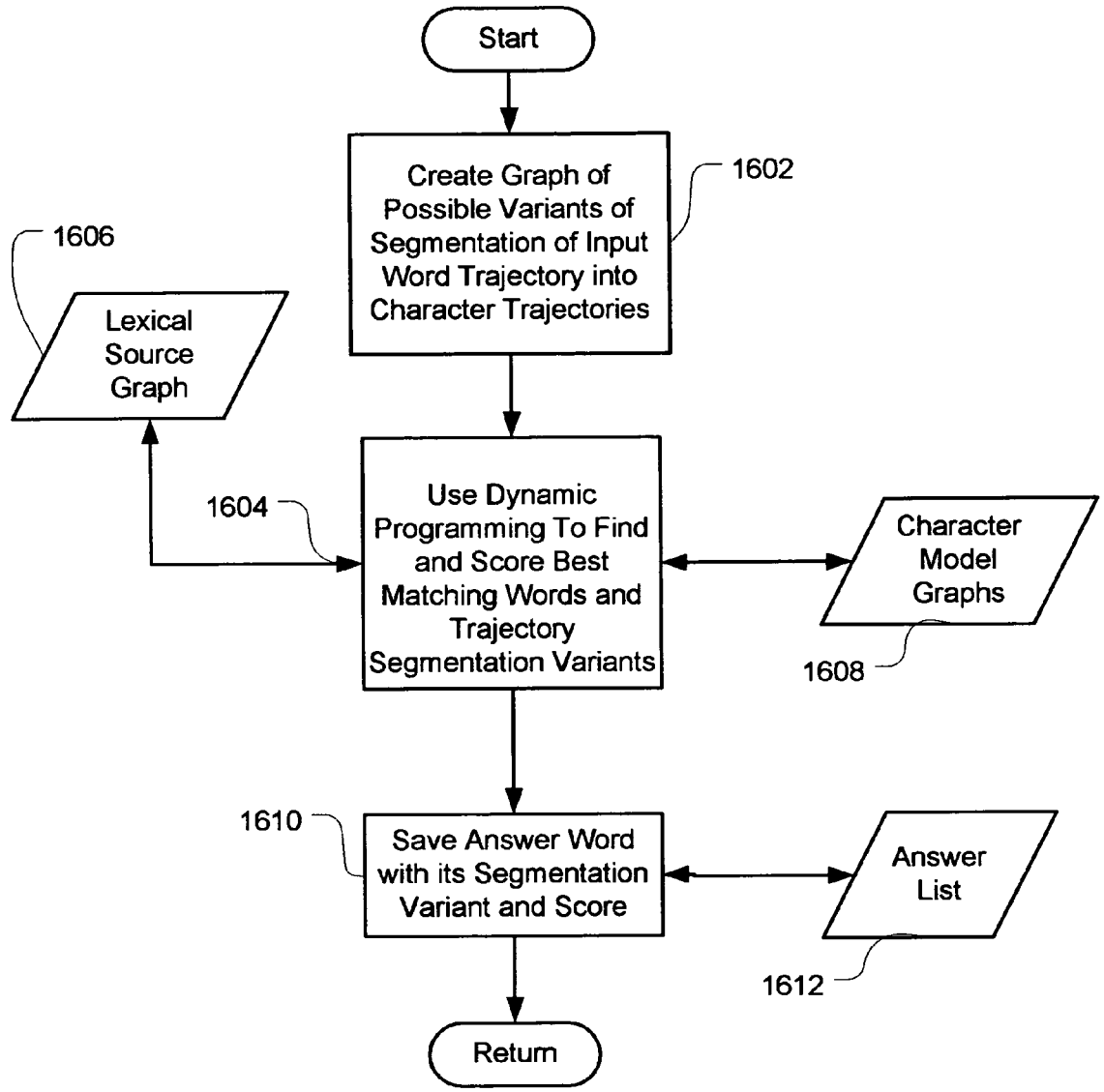
FIG. 16 shows one embodiment of the word recognizer 1504 in FIG. 15.

FIG. 16 shows the operational flow of one embodiment of a word recognizer making use of the character model graphs and using dynamic programming. The operation flow begins with create segmentation graph operation 1602. This operation creates different variants of segmentation of the input word trajectory into character trajectories. The segmentation points are deliberately varied as it is not clear which segmentation of the input word trajectory will lead to the most accurate recognition of the word. Different variants of segmentation are represented as a segmentation graph. In this graph each node represents a segmentation point, an edge between a pair of nodes represents a portion of the input word trajectory between corresponding segmentation points which possibly corresponds to a character. Of course, some of the edges might represent a combination of edges and thus a combination of character trajectories, which means that we are not sure, if a corresponding piece of trajectory represents one or several characters. Each path from beginning node to ending node of this graph corresponds to one possible variant of segmentation of the input word trajectory segmented into character trajectories. This word input segmentation graph is similar to the character input graph in FIG. 5 except now the graph represents the entire word trajectory, nodes are segmentation points and edges are trajectories between segmentation points.

Dynamic programming recognition module 1604 works with an input word segmentation graph and with a predetermined lexical source 1606 represented as a directed acyclic graph. Lexical source can correspond to a vocabulary, to a lexical database or even to one word. Lexical source is represented as a graph in which an edge corresponds to a character and each path from beginning to ending node corresponds to a possible string of characters (possible word).

The dynamic programming module finds the best pairs of paths in the input word segmentation graph and in the lexical source graph. A path in the first graph of a pair represents a segmentation variant, a path in the second graph represents a string of characters, i.e. an answer word. As mentioned earlier, dynamic programming to process input graphs is described in "Coding and comparison of DAGs as a novel neural structure with applications to on-line handwriting recognition," by I-John Lin and S. Y. Kung (IEEE Transactions on Signal Processing, 45(11):2701-8, November 1997.

Briefly for each trajectory segment corresponding to an edge in segmentation graph (i.e. possible character trajectory candidate), the dynamic programming module 1604 finds or recognizes several best possible characters using character graph recognizer described in this patent, i.e. comparing input graph for current trajectory segment with different character model graphs as described in FIG. 9. In many cases one and the same piece of trajectory can be recognized as more than one character with almost equal confidence or score. For instance, trajectory of letter "O" in many cases can be equally confidently recognized as trajectory of digit "0"; trajectory of handwritten lowercase letter "l" in some cases can be with almost equal confidence recognized as trajectory of handwritten lowercase letter "e".

Different trajectory segments are combined to produce different variants of the whole word trajectory segmentation, and different characters are combined to produce different words from the lexical source. The character model graphs used to recognize a next trajectory segment become more limited as the dynamic programming module works its way along the segments of trajectory from left to right. The character model graphs used to recognize each trajectory segment are limited according to possible words stemming from variants of early character strings recognized for the previous part of trajectory. Variants of continuation of each character string are determined by our lexical source (for instance, by vocabulary). The similarity score is determined for each character and is summed character by character along the segmentation path and the word as both extend during the dynamic programming recognition process. As the last edge in the segmentation graph is processed, the result will be a set of best answer words with the best segmentation variant for each answer word and the score calculated for this word and this segmentation variant. Different word answers can arise from different variants of segmentation or they can arise from the same variant of segmentation. For each of these answer words, save operation 1610 will save the word itself, the best segmentation variant corresponding to this word and their score in the answer list 1612.

Returning now to FIG. 15, evaluate module 1506 receives the input sample word trajectory and the answers list from the recognition operation 1504 and evaluates a word error function for the current sample word from the work set. The sample word recognition error depends on the differences between the score of the correct answer word and the scores of incorrect answers on the answer list. The evaluate module 1506 is shown and described now with reference to FIG. 17.

Figure 17:
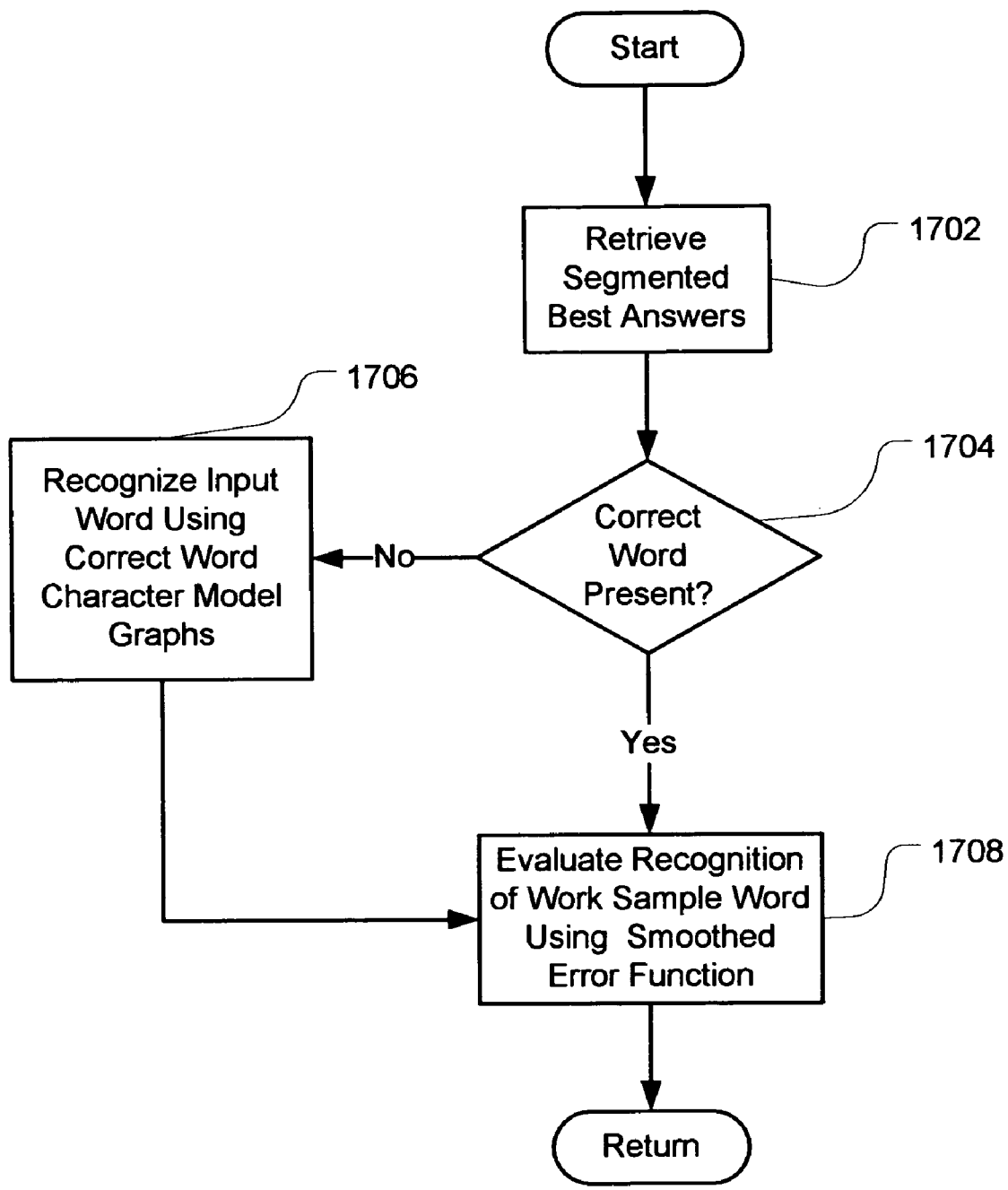
FIG. 17 shows one embodiment of the evaluation module 1506 in FIG. 15.

FIG. 17 shows one embodiment of the operational flow for the evaluate module 1506 in FIG. 15. Retrieve operation 1702 retrieves a predetermined number of words and their recognition scores from the answer list. For example the ten answer words with the highest scores could be retrieved. Correct word test operation 1704 compares the retrieved answers to the correct word to detect whether the correct word is present in the answers retrieved by operation 1702. If the correct word is in the best answer list retrieved by operation 1702, the operation flow branches "yes" to evaluate recognition error operation 1708. If the correct word is not in the best answer list, than the operation flow branches "no" to the correct word recognize operation 1706. Recognize operation 1706 uses dynamic programming to recognize the correct word from the input word trajectory in the same manner as described above with reference to FIG. 16. The only difference is that now we have a lexical source consisting of one word only (the correct word). Therefore, operation 1706 only uses character model graphs for the correct word, and it only provides one answer, the correct word, and segmentation variant with the highest score for this word. Correct word recognize operation 1706 finishes by adding the correct word and its score to the best answer list.

The evaluate recognition error operation 1708 computes an error function based on the differences between the scores for incorrect answer words from the best answer list and the score for the correct word. An example of computing such an error function is described in an article entitled "Discriminative Training for Continuous Speech Recognition" by W. Reichl and G. Ruske (Proceedings EUROSPEECH-95, Madrid, Spain, September, 1995, pp. 537-540). The value of the error is close to "0" if all the score differences between the incorrect answer words and the correct word are negative, i.e. the correct word has the best score. It is close to "1" in cases where the score differences between some of the incorrect answer words and the correct word are positive and not very small, i.e. some of the incorrect answer words have a substantially better score then the correct word. Finally, it is between "1" and "0" when the highest score differences between the incorrect answer words and the correct word are a little greater than 0. This function constitutes a work sample word recognition error that can be regarded as an approximation of a misrecognition rate for the word that varies with changes in the parameters in the character model graphs.

Returning again to FIG. 15, gradient operation 1508 calculates the gradient of the sample word recognition error as a function of changes in the parameters of the model graphs. In effect gradient operation 1508 is taking a partial derivative of the character recognition error with parameter variations of model graphs and looking at the rate of change of recognition error for the sample word due to variations in the parameters.

After the sample word gradient is calculated, recalculate operation 1510 recalculates the average error for the work sample set and the work-sample-set's gradient of average error. This recalculation is based on (1) the existing average error the work set and it's gradient and (2) the current sample word error and it's gradient just calculated in operations 1506 and 1508. Once the average gradient is recalculated to incorporate the results from the latest work sample word, the more work sample words query operation 1512 asks whether there are more work sample words to be evaluated. If there are more work sample words, then the operation flow branches back to the get the next work sample word at get operation 1502. Get operation 1502 gets the next sample word in the work set. The recognition module 1504 and the evaluate module 1506 repeat their operations with the next work sample word. The calculate gradient operation 1508 is repeated. Finally, the average error for the work set and it's gradient are recalculated incorporating the results of this next work sample word evaluation. When all work sample words have been evaluated the more work sample words test operation 1512 branches the operation flow "no" to adjust parameters operation 1514.

The adjust parameters operation 1514 makes use of a generalized Baum re-estimation algorithm to adjust parameters in the character model graphs and create an updated parameter set. The generalized Baum algorithm is described in the publication, "A generalization of the Baum algorithm on nonlinear manifolds," by D. Kanevsky, In Proc. International Conf. on Acoustic, Speech and Signal processing, vol. 1, pp. 473-476. The calculated recognition error average gradient for the work set from recalculate operation 1510 is used in accordance with Baum re-estimation formulas to adjust parameters in the model graphs to decrease the work set recognition error. The recognition error is close to the percent of incorrectly recognized words. Therefore by reducing the recognition error, we also decrease the number of incorrectly recognized words.

Once adjustment of parameters has been made, we check for a new recognition error rate on words in a test word set, comparing a recognition error function when using adjusted parameters in the updated parameter set with the recognition error of our recognizer when it used previous values of the model graphs parameters. The reason for using a test word set of samples different from the work set is that we don't want our system to "overlearn", i.e. to adjust too closely to our specific work set at the cost of less general descriptions of characters.

The operational flow for processing the test word set proceeds as follows. After the parameters are adjusted in operation 1514, get word operation 1516 gets a test word from the test word set. Recognize module 1518 recognizes the test word using the character model graphs with parameters adjusted based on the average gradient for the work set from recalculate operation 1510. If there are more test words in the test set, the operation flow returns to get word operation 1516 to get the next test word, otherwise it branches to the calculate correct recognition percent operation 1522 and then to save current parameters operation 1524. The calculate recognition value operation 1522 is calculating the percent of correct recognitions in the test set resulting from the use of the adjusted parameters in the updated parameter set. A correct recognition occurs when the best answer, a recognition answer that has the highest recognition confidence or score, from the recognizer is a word that is the same as the test word being recognized. Save operation 1524 saves the updated parameter set along with the correct recognition value for this parameter set. Alternative the calculate correct recognition value operation could calculate the number of mis-recognitions for the test set, i.e. where the best answer was not the correct word. This is also a measure of correct recognition for the test set.

More iterations operation 1526 will branch "yes" to begin a new iteration operation 1530 until a predefined number of iterations have occurred. Typically thirty iterations will produce a percent of correct recognitions on the test word set that starts to decrease from a highest correct recognition value. In general, the more iterations test operation 1526 is detecting when the correct recognition value has reached an optimum value. In the case of correct recognitions the optimum value would be a maximum, while for mis-recognitions the optimum value would be a minimum. In effect, test operation 1526 is looking for a transition value where the correct recognitions value is at a peak or a valley depending upon whether the correct recognition value is tracking recognitions or mis-recognitions.

New iteration operation 1530 starts a new cycle through the work set; in this cycle the current values of model graph parameters as just adjusted by adjust operation 1514 will be used. After the work set is processed with the current parameters, the parameters are again adjusted by adjust operation 1514 to create an updated parameter set, and the test word set is processed against this updated parameter set.

When the predetermined number of iterations have been completed as detected by more iterations test 1526, the operation flow branches "no" to choose best parameters operation 1528. This operation examines for the optimum value the correct recognition values saved by operation 1524. When it locates the correct recognition value having an optimum value, it retrieves the parameter set saved with that optimum correct recognition value and selects this parameter set as the best parameter set providing the highest correct recognition percentage. This best parameter set is retrieved, and used in the character model graphs by the online character recognizer (FIG. 2). This completes the training of the character recognizer.

While the invention has been particularly shown and described with reference to preferred embodiments thereof, it will be understood by those skilled in the art that various other changes in the form and details may be made therein without departing form the spirit and scope of the invention.

What is claimed is:

1. A method for creating character model graphs for an on-line recognizer of handwritten text, the method comprising:
generating character model graphs from typical shapes of characters, the character model graphs having a set of adjustable parameters;
recognizing sample words in a work set using the character model graphs;
evaluating a recognition error for a sample word;
calculating a gradient of the recognition error;
adjusting the adjustable parameters of the character model graphs to provide an updated set of the adjustable parameters, based on at least one of the recognition error and the gradient of the recognition error;
recognizing test words in a test set using character model graphs with the updated set of adjustable parameters;
calculating a correct recognition value for the test set when using the model graphs with the updated set of adjustable parameters;
iterating the above sequence of acts until the correct recognition value reaches an optimum value; and
selecting the updated set of adjustable parameters yielding the correct recognition value having the optimum value as the set of adjustable parameters to be used in character model graphs.

2. The method of claim 1 wherein:
the recognition error includes a recognition error for the work set;
the gradient includes a gradient of the recognition error for the work set as a function of the adjustable parameters; and
the parameters are adjusted based on the gradient of the recognition error for the work set.

3. The method of claim 1 wherein evaluating the recognition error comprises:
retrieving one or more best answers for each sample word;
comparing recognition scores of the best answers to a recognition score of the correct answer for the sample word; and
generating a word recognition error based on the differences between recognition scores of the best answers relative to the recognition score of the correct answer.

4. The method of claim 3 wherein calculating the gradient of a the recognition error comprises:
calculating a gradient of the word recognition error; and
calculating the gradient of the recognition error for the work set by averaging the gradient of the word recognition error with gradients of word recognition errors of previous words in the work set recognized by the act of recognizing sample words.

5. The method of claim 4 wherein the parameters are adjusted based on the gradient of the recognition error for the work set.

6. The method of claim 1 wherein generating a correct recognition value comprises calculating the percentage of words in the test set where the best recognition answer is substantially same as the test word.

7. The method of claim 1 further comprises:
saving the recognition error value and the updated set of the adjustable parameters for each iteration.

8. The method of claim 7 wherein the iterating is performed a predetermined number of times, and selecting the updated set of adjustable parameters further comprises:
searching the saved recognition error values for the optimum value; and
retrieving the updated set of adjustable parameters saved with the recognition error value having the optimum value.

9. A system for optimizing character model graphs comprising:
a first recognition module to recognize sample words from a work set using character model graphs defined by a parameter set, the first recognition module is to generate recognition error information for the work set and to adjust the parameters in the parameter set based on the recognition error information;
a second recognition module coupled to the first recognition module, to recognize test words from a test set with character model graphs using the adjusted parameter set, and to generate a correct recognition value for the test set based on correct recognition of the test words in the test set; and
an iteration module coupled to the first and second recognition modules, to repeatedly execute the first recognition module and the second recognition module until the correct recognition value reaches an optimum value.

10. The system of claim 9 wherein the recognition error information for the work set is generated from a gradient function that indicates the change in error as a function of the change in parameters in the parameter set.

11. The system of claim 10 wherein the correct recognition value is a measure of the number of words in the test set correctly recognized during a given iteration.

12. The system of claim 9 wherein the iteration module is to perform iterations for a predetermined number of times sufficient for the correct recognition value to reach an optimum value.

13. The system of claim 9 wherein the iteration module is to perform iterations until the correct recognition value passes through an optimum value.

14. The system of claim 9 wherein the first recognition module comprises:
an evaluation sub-module to evaluate an recognition error for a sample word in the work set;
a word error sub-module coupled to the evaluation sub-module, to calculate the rate of change of the recognition error with a change in the parameter set; and
a work set error sub-module coupled to the evaluation sub-module and the word error sub-module, to calculate the average rate of change of the recognition error for the work set to provide a recognition error for the work set.

15. A computer readable medium for storing computer instructions for a computer process for training character model graphs to optimize the recognition of text by a recognizer using the character model graphs, the computer process comprising:
recognizing words from a first set of words using a current parameter set for the character model graphs and generating a recognition error gradient for the first set based on changes in the word recognition error as a function of changes in parameters in the current parameter set of the character model graphs;
adjusting the parameters of the character model graphs in response to the recognition error gradient to create an updated parameter set for the character model graphs;
recognizing words from a second set of words using the updated parameter set and generating a correct recognition value, the correct recognition value being associated with the updated parameter set for the character model graphs; and
repeating all of the above acts until the correct recognition value reaches a transition value and selecting the parameter set associated with the transition value as the optimum parameters for the character model graphs.

16. The computer readable medium of claim 15 wherein the repeating further comprises:
saving the updated parameter set as the current parameter set prior to recognizing words from a first set.

17. The computer readable medium of claim 16 wherein the repeating further comprises:
saving a correct recognition value in association with each updated parameter set; and
choosing an updated parameter set as an optimum parameter set when the associated correct recognition value represents a transition value.

18. The computer readable medium of claim 17 wherein the transition value is a maximum and the correct recognition value is a measure of correct answers when recognizing words from the second set.

19. The computer readable medium of claim 17 wherein the transition value is a minimum and the correct recognition value is a measure of mis-recognitions when recognizing words from the second set.

20. The computer readable medium of claim 15 wherein recognizing words in the first set comprises:
evaluating the word recognition error for a word in the first set;
calculating the rate of change of the word recognition error with a change in parameters between the current parameter set and a previous parameter set; and
calculating the average rate of change of the word recognition error for the first set to provide the recognition error gradient for the first set.

21. A method for creating character model graphs for a set of reference characters for use by a character recognizer, the method comprising:
determining a plurality of typical character shapes for a reference character;
creating a character shape model graph for each typical character shape of the reference character;
merging a plurality of the character shape model graphs for the reference character into a single character model graph by compressing data for the plurality of the character shape model graphs; and
repeating the determining, the creating and the merging for each reference character to create the character model graphs for the set of the reference characters for the character recognizer.

22. The method of claim 21 wherein the edges of each character model graph are defined by values in similarity vectors.

23. A method for creating character model graphs of reference characters for use by a character recognizer, the method comprising:
determining a predetermined number of typical character shapes for a reference character;
creating a character shape model graph for each typical character shape of the reference character;
merging all character shape model graphs for the reference character into a single character model graph; and
repeating the determining, the creating and the merging for each reference character to create character model graphs for the reference characters for use by the character recognizer,
wherein the edges of each model graph are described as a vectors of cosine coefficients.

24. The method of claim 23 further comprising:
converting the cosine coefficient vector for each edge of a character model graph into values in similarity vectors.

25. The method of claim 23 wherein creating typical character shapes comprises:
clustering all possible character shapes for a character into a predetermined number of clusters of similar shapes with each shape represented by a vector;
determining a center vector for each cluster; and
restoring a typical character shape for each cluster from the center vector for each cluster to create the predetermined number of typical character shapes for each character.

26. The method of claim 23 wherein merging each character shape model graph further comprises:
calculating the vector parameters of the character model graph to average the parameters of each character shape model graph, being merged with the character model graph, into the vector parameters for the character model graph.

27. The method of claim 26 wherein the vector parameters are cosine coefficients.

28. The method of claim 27 further comprising:
converting the cosine coefficient vector for each character model graph into a similarity vector.

29. The method of claim 23 further comprising:
recognizing words from a first set of words using a current parameter set for the character model graphs;
generating a recognition error gradient for the first set based on changes in the word recognition error as a function of changes in parameters in the current parameter set of the character model graphs;

adjusting the parameters of the character model graphs in response to the recognition error gradient to create an updated parameter set for the character model graphs;

recognizing words from a second set of words using the updated parameter set and generating a correct recognition value, the correct recognition value being associated with the updated parameter set for the character model graphs;

repeating the recognizing words in the first set, the adjusting the parameters and the recognizing words in the second set until the correct recognition value reaches an optimum value; and selecting the parameter set associated with the optimum value as the optimum parameters for the character model graphs.

* * * * *